· US 11,326,706 B2
(12) United States Patent
Pierce et al.

(10) Patent No.: US 11,326,706 B2
(45) Date of Patent: May 10, 2022

(54) PORTABLE VALVE OPERATING MACHINE FOR USE IN EXERCISING VALVES

(71) Applicant: ILLINOIS TOOL WORKS INC., Glenview, IL (US)

(72) Inventors: Kenneth R. Pierce, Arlington Heights, IL (US); Michael W. Gearhart, Schaumburg, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 17/165,019

(22) Filed: Feb. 2, 2021

(65) Prior Publication Data
US 2021/0254747 A1 Aug. 19, 2021

Related U.S. Application Data

(60) Provisional application No. 62/976,405, filed on Feb. 14, 2020.

(51) Int. Cl.
*F16K 31/46* (2006.01)
*F16K 31/04* (2006.01)
*F16K 31/53* (2006.01)
*F16K 31/05* (2006.01)
*G01S 19/13* (2010.01)

(52) U.S. Cl.
CPC ............ *F16K 31/055* (2013.01); *G01S 19/13* (2013.01)

(58) Field of Classification Search
CPC ........ F16K 31/055; F16K 31/05; F16K 31/04; F16K 31/46; F16K 31/53; B25B 21/002; G01S 19/13
See application file for complete search history.

(56) References Cited

U.S. PATENT DOCUMENTS

| 1,979,340 A | 11/1934 | Norman |
| 4,994,001 A * | 2/1991 | Wilkinson ........... F16H 37/0826 |
| | | 251/129.03 |
| 5,361,996 A | 11/1994 | Svensson et al. |

(Continued)

FOREIGN PATENT DOCUMENTS

| DE | 34 12 032 A1 | 12/1984 |
| DE | 20 2012 008347 U1 | 9/2012 |
| EP | 3 275 596 A1 | 1/2018 |

OTHER PUBLICATIONS

International Search Report for International Patent Application No. PCT/US2021/018024 dated Aug. 2, 2021, 7 pages.

(Continued)

*Primary Examiner* — Marina A Tietjen
(74) *Attorney, Agent, or Firm* — Klintworth & Rozenblat IP LLP

(57) ABSTRACT

A valve operating machine includes a base having a housing thereon. A motor, and a planetary gearbox are mounted within cavities in the housing. A motor gear, a planetary input gear and an idler gear are mounted within a separate cavity. The motor gear is mounted for rotation with a motor shaft of the motor and the planetary input gear is mounted for rotation with a planetary gear spindle of the planetary input gear. The idler gear is engaged with the motor and planetary input gears. An output socket is connected to the planetary gearbox for connection to a key that is used to exercise a valve.

22 Claims, 19 Drawing Sheets

(56) References Cited

U.S. PATENT DOCUMENTS

| | | | |
|---|---|---|---|
| 5,570,581 A * | 11/1996 | Preston | F16K 31/12 60/483 |
| 6,282,989 B1 | 9/2001 | Sorter | |
| 2004/0045414 A1 | 3/2004 | Reuschel | |
| 2009/0267010 A1 * | 10/2009 | Ferrar | B25J 19/0004 251/231 |
| 2012/0138830 A1 * | 6/2012 | Ferrar | F16K 31/12 251/248 |
| 2017/0067575 A1 * | 3/2017 | Preston | F16K 31/46 |
| 2020/0230827 A1 * | 7/2020 | Wozniak | B25J 5/007 |

OTHER PUBLICATIONS

Written Opinion for International Patent Application No. PCT/US2021/018024 dated Aug. 2, 2021, 7 pages.
International Search Report for International Patent Application No. PCT/US2021/017764 dated Jun. 25, 2021, 5 pages.
Written Opinion for International Patent Application No. PCT/US2021/017764 dated Jun. 25, 2021, 5 pages.
Machine Translation of DE 3412032 A1.
Machine Translation of DE 202012008347 U1.

* cited by examiner

PORTABLE VALVE OPERATING MACHINE FOR USE IN EXERCISING VALVES

PRIOR APPLICATION

This application claims the domestic benefit of U.S. Provisional Patent Application Ser. No. 62/976,405, filed on Feb. 14, 2020, the contents of which are incorporated herein in its entirety.

FIELD OF THE INVENTION

The present disclosure generally relates to exercising valves.

BACKGROUND

Municipalities and the like have extensive networks of piping to control the flow of water from storage and pumping stations to users. The network of piping includes numerous valves such that portions of the network can be closed off as needed for service while the remainder of the network remains in operation. The piping required for such networks can range in size from as small as three or four inches in diameter to as large as three feet in diameter. Also, the valves of the system typically remain in an open condition or in a closed condition for very long periods of time.

The valves of a municipal water system are located below ground with an access shaft extending from the valve stem to the surface through which an elongate key is extended to turn the stem. Such valves typically include a screw that is rotatable through one hundred turns or more to fully open or fully close the valve. Also, underground valves undergo a certain degree of deterioration over time and it is common for valves to become frozen or locked into their current position as a result of contamination on the surface of the screw or deterioration of the parts. As a result, the large amount of torque needed to open and close such valves is provided by a motorized valve turning machine.

It has been found that a valve turning machine attached by a key to a valve and with torque applied to the key by the machine, the machine will shake and toss violently as the valve is exercised. The shaking and tossing are a result of the uneven torque applied to the key as the turning screw encounters areas of contamination by foreign materials and deterioration of the moving parts. The shaking and tossing of the machine include vertical components of force which cause the key to be pulled free of the valve stem, thereby interrupting the valve turning operation and perhaps causing damage to either the machine or the valve. To retain the machine and the key in their desired orientation with respect to the valve stem, the operator is required to grasp the machine with his/her arms and use his/her body weight to hold the machine in the desired orientation as the valve is exercised.

SUMMARY

The present disclosure is defined by the following claims, and nothing in this section should be taken as a limitation on those claims.

In one aspect, a portable valve operating machine for use in exercising valves is provided.

In one aspect, a portable valve operating machine for use in exercising valves includes a base having a housing thereon. A motor, and a planetary gearbox are mounted within cavities in the housing. A motor gear, a planetary input gear and an idler gear are mounted within a separate cavity. The motor gear is mounted for rotation with a motor shaft of the motor and the planetary input gear is mounted for rotation with a planetary gear spindle of the planetary input gear. The idler gear is engaged with the motor and planetary input gears. An output socket is connected to the planetary gearbox for connection to a key that is used to exercise a valve.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Figure 1:
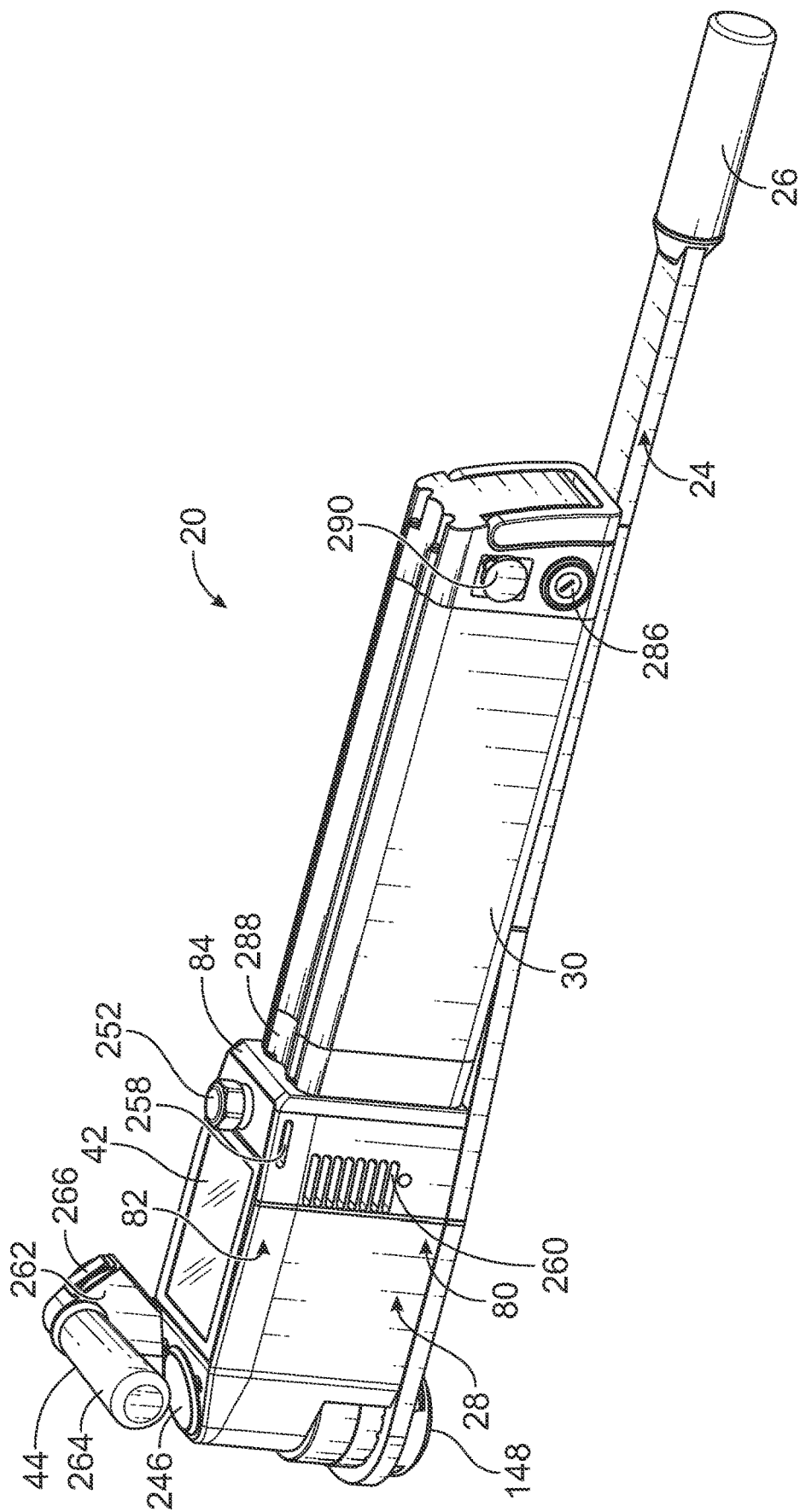
FIG. 1 is a perspective view of a valve operating machine in accordance with the present disclosure.
Figure 3:
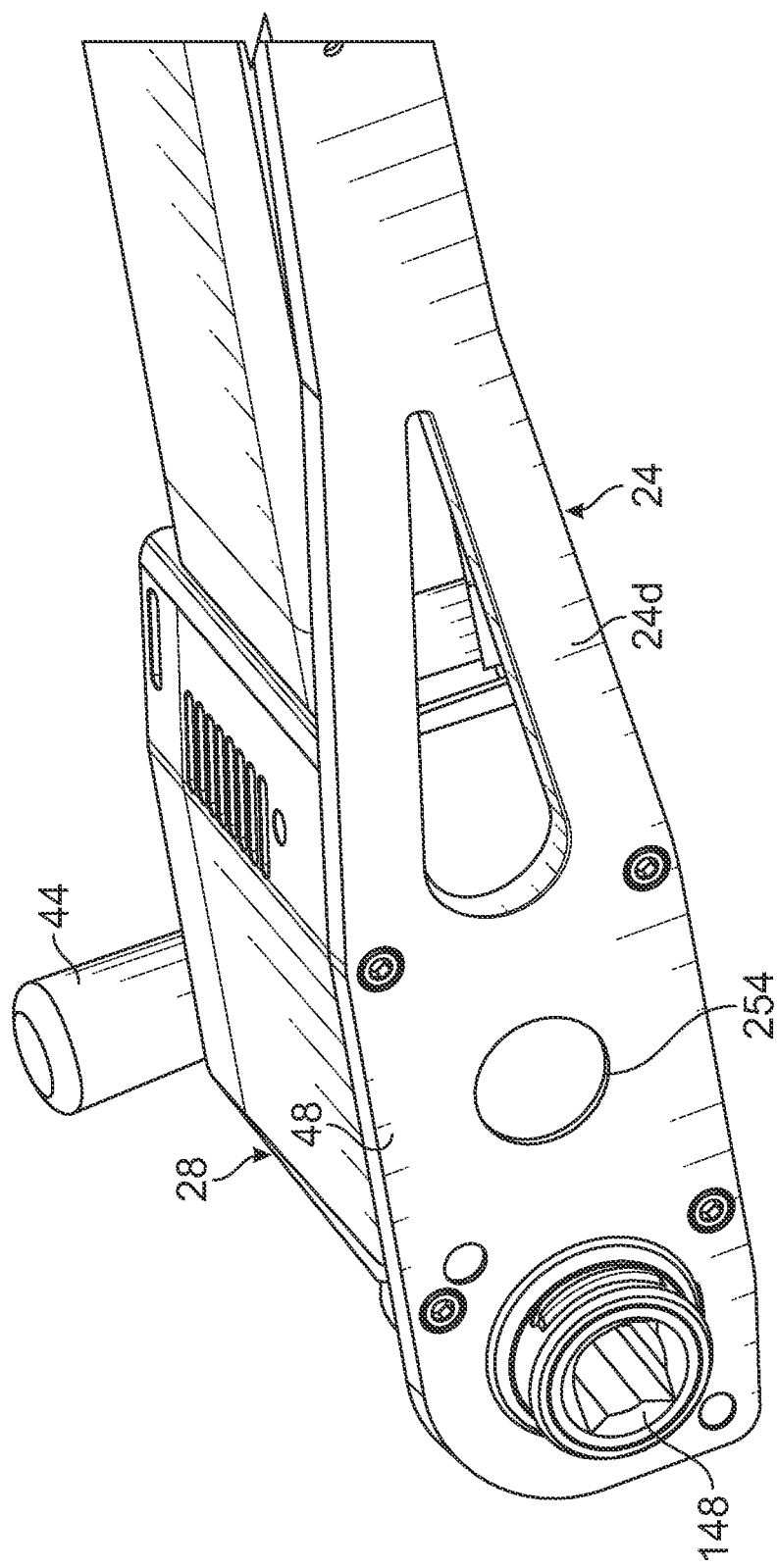
FIG. 3 is a partial bottom perspective view of the valve operating machine.
Figure 4:
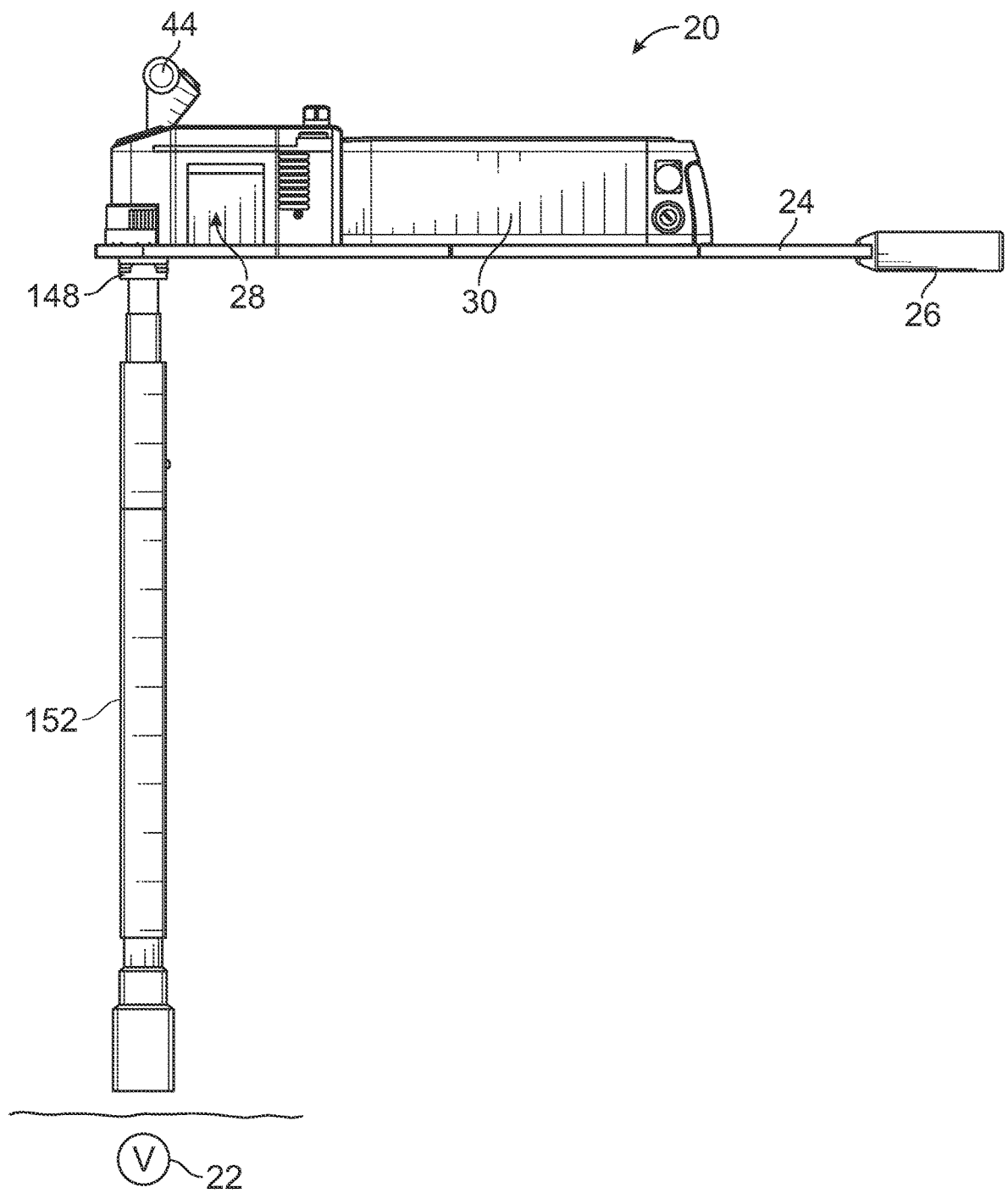
FIG. 4 is a side elevation view of the valve operating machine having a key attached thereto, with an underground valve shown in schematic form.

Referring to FIGS. 1, 3 and 4, an example of a portable valve operating machine 20 is shown which is used to exercise a valve 22, which in some examples may be an underground valve. The portable valve operating machine 20 can be easily carried by an operator to a job site.

Figure 6:
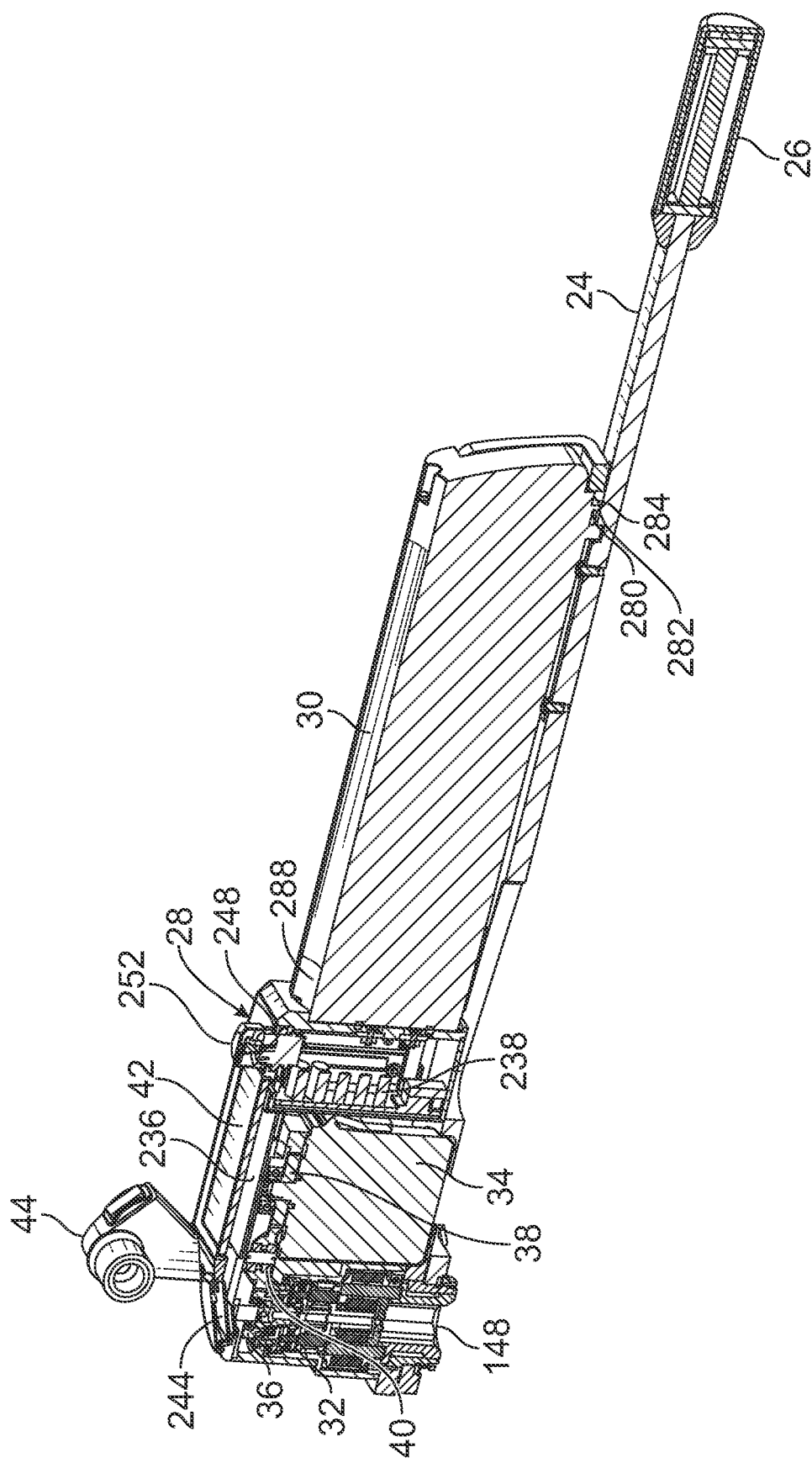
FIG. 6 is a cross-sectional view of the valve operating machine shown in perspective.
Figure 7:
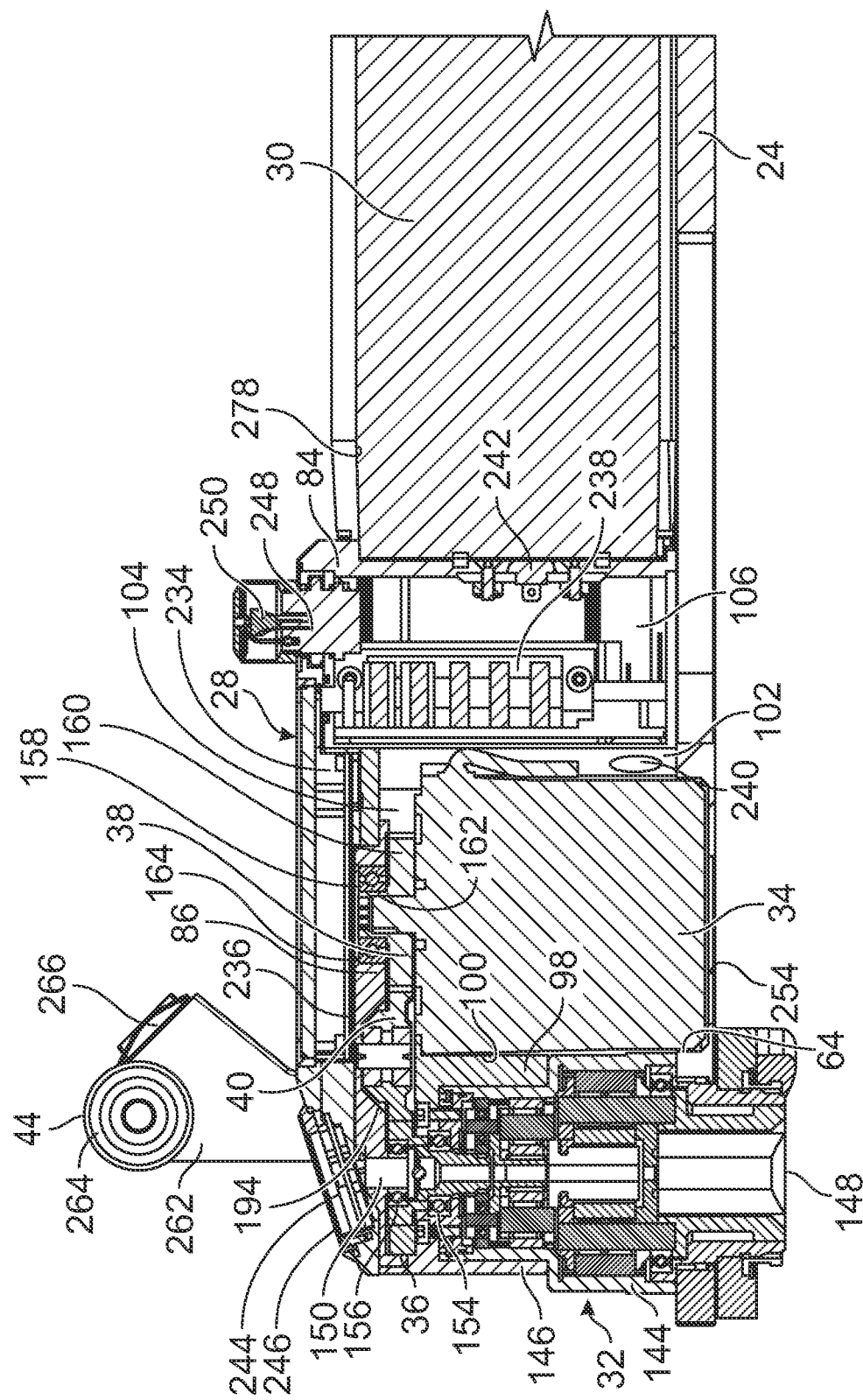
FIG. 7 is a partial cross-sectional view of the valve operating machine.

The valve operating machine 20 includes a base 24 and a first handle 26, a housing 28, and a battery 30 on the base 24. As shown in FIGS. 6 and 7, a planetary gearbox 32, a motor 34, and a plurality of gears 36, 38, 40 which are configured to be engaged with the motor 34 and the planetary gearbox 32 are within the housing 28. A display 42 is mounted to the housing 28 and a second handle 44 is attached to the housing 28. In use, the operator grasps the handles 26, 44 to steady the valve operating machine 20. Information regarding the exercising of the valve 22 is shown on the display 42. The valve operating machine 20 is used in a relatively high-power valve turning operation. The valve operating machine 20 provides a small form factor as a result of the packaging of the operating components.

Figure 8:
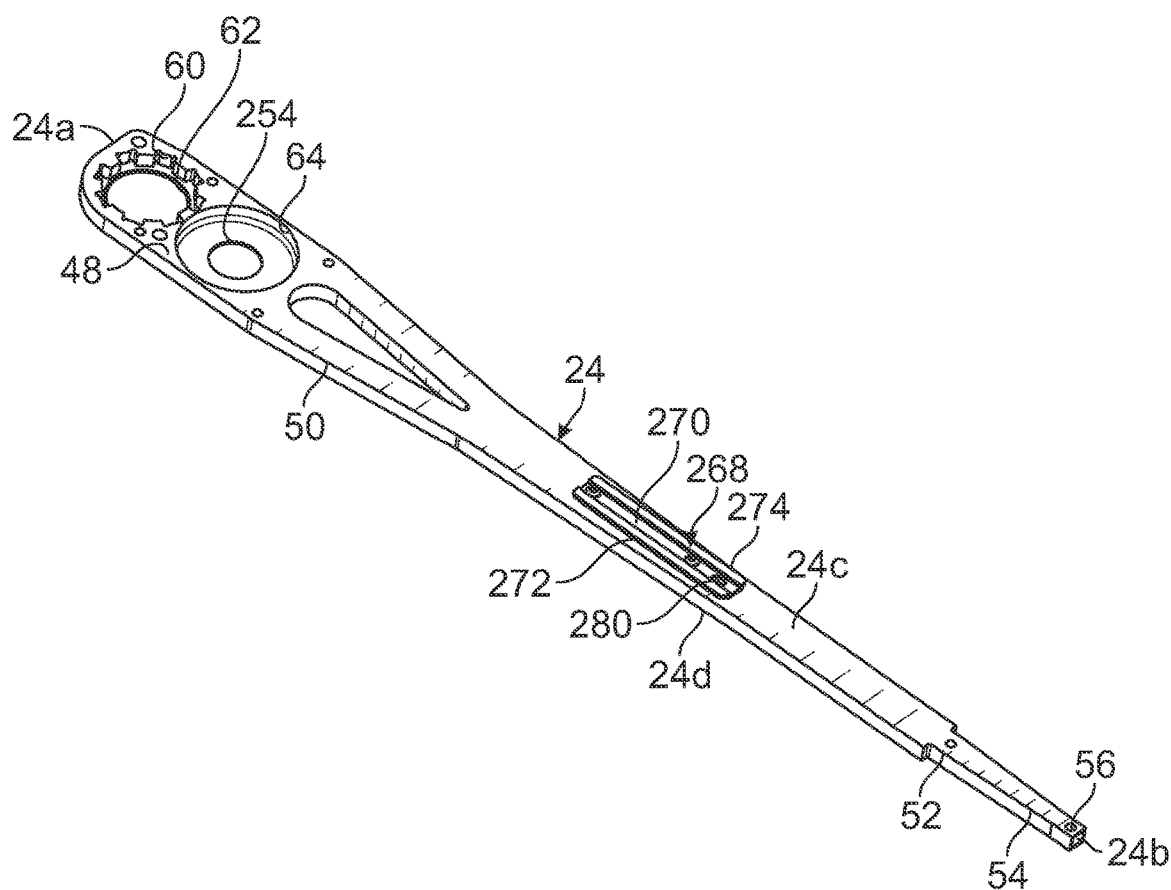
FIG. 8 is a perspective view of a base of the valve operating machine.
Figure 9:
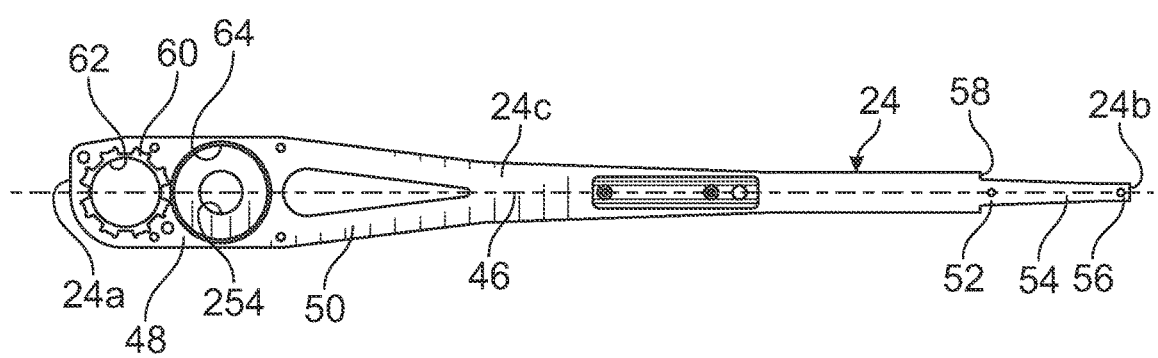
FIG. 9 is a top plan view of the base of FIG. 8.

As best shown in FIGS. 8 and 9, the base 24 is a rigid and elongated plate having front and rear opposite ends 24a, 24b, a planar upper surface 24c, and a planar lower surface 24d. A central axis 46 extends from the front end 24a to the rear end 24b. The base 24 includes a first section 48 which extends from the front end 24a rearwardly, a second intermediate section 50 which extends from a rear end of the first section 48 rearwardly, a third intermediate section 52 which has a rectangular cross-section which extends from a rear end of the second section 50 rearwardly, a fourth tapered section 54 which extends from a rear end of the third section 52 rearwardly, and a fifth section 56 which has a rectangular cross-section which extends from a rear end of the fourth section 54 rearwardly to the rear end 24b. The first section 48 is generally rectangular when viewed looking at the upper surface 24c thereof. The second section 50 reduces in width between the first section 48 and the third section 52. The second and third sections 50, 52 are separated from each other by a shoulder 58 such that the rear end of the second section 50 is wider than the front end of the third section 52 when viewed from above the upper surface 24c. The third section 52 is wider than the fifth section 56 when viewed from above the upper surface 24c.

A front pocket 60 extends downward from the upper surface 24c through the first section 48 proximate to the front end 24a of the base 24. A cylindrical central passageway 62 is provided within the pocket 60 and extends to the lower surface 24d, and has a diameter which is less than the front pocket 60. A center of the passageway 62 aligns with the central axis 46 of the base 24. A rear pocket 64 extends downward from the upper surface 24c through the first section 48 rearwardly of the front pocket 60 and proximate to the rear end of the first section 48.

Figure 10:
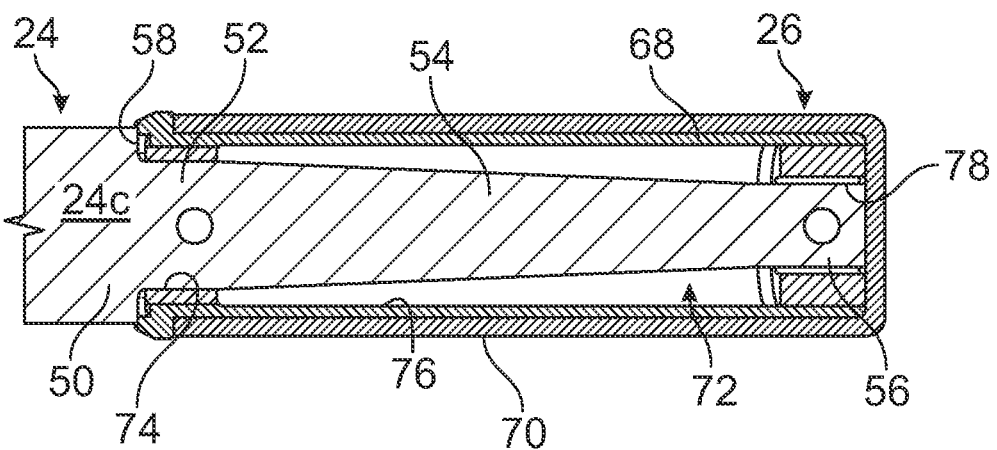
FIG. 10 is a partial cross-sectional view of the valve operating machine.
Figure 11:
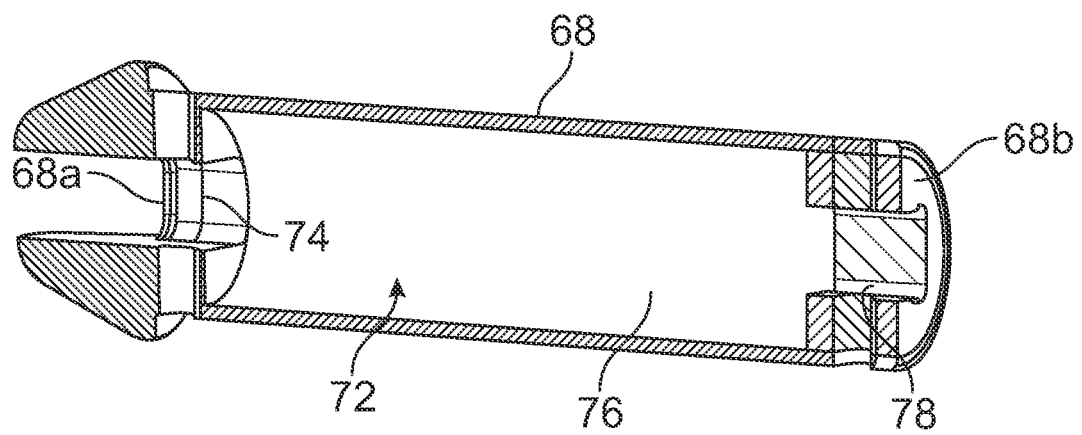
FIG. 11 is a cross-sectional view of a portion of a handle of the valve operating machine shown in perspective.

The handle 26 covers the rear end 24b of the base 24. As best shown in FIGS. 10 and 11, the handle 26 includes a base portion 68 which is attached to the third and fifth sections 52, 56 and engages against the shoulder 58 and a grip portion 70 which covers an exterior surface of the base portion 68. The base portion 68 has an exterior cylindrical surface and has a central passageway 72 extending from a front end 68a thereto to a rear end 68b thereof. A first section 74 of the passageway 72 has a rectangular cross-section and extends rearwardly from the front end 68a, a second section 76 of the passageway 72 is cylindrical and extends rearwardly from a rear end of the first section 74, and a third section 78 of the passageway 72 has a rectangular cross-section and extends rearwardly from the rear end of the second section 76. The third section 52 of the base 24 seats within the first section 74 of the passageway 72 and mirrors the shape thereof. The fifth section 56 of the base 24 seats within the third section 78 of the passageway 72 and mirrors the shape thereof. Since the base 24 and the base portions 68 have sections 52, 74 and 56, 78 which mirror each other in shape, the base portion 68 cannot rotate relative to the base 24. Fasteners are provided through aligned bores in the base 24 and in the base portion 68 to secure the base portion 68 onto the rear end of the base 24. The grip portion 70 covers the exterior surface of the base portion 68 to provide a cushioning material for the operator to grip.

Figure 2:
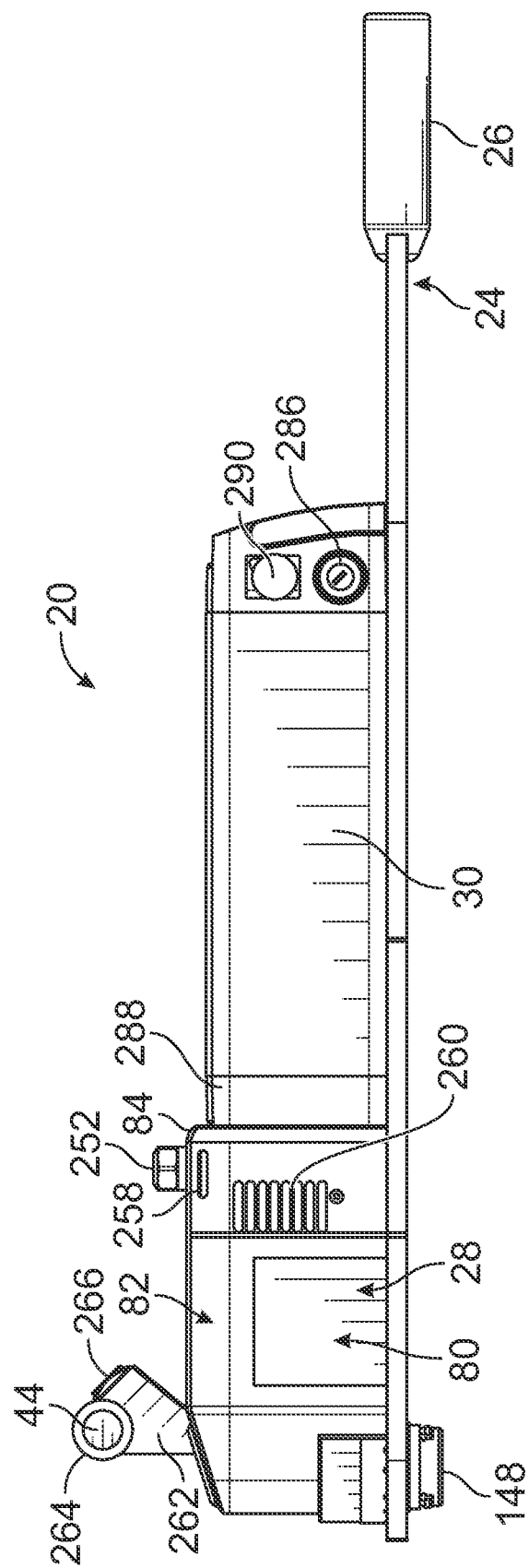
FIG. 2 is a side elevation view of the valve operating machine.

The housing 28, see FIGS. 1, 2 and 7, includes a lower housing portion 80 which is mounted on the base 24, an upper housing portion 82 mounted on the lower housing portion 80, a rear wall 84 which closes rear ends of the lower and upper housing portions 80, 82, and a gear cover 86 mounted on the lower housing portion 80 and between the lower housing portion 80 and the upper housing portion 82. The lower and upper housing portions 80, 82 are preferably form from metal so as to be robust. The rear wall 84 is non-metallic. The gear cover 86 may be formed from metal.

Figure 12:
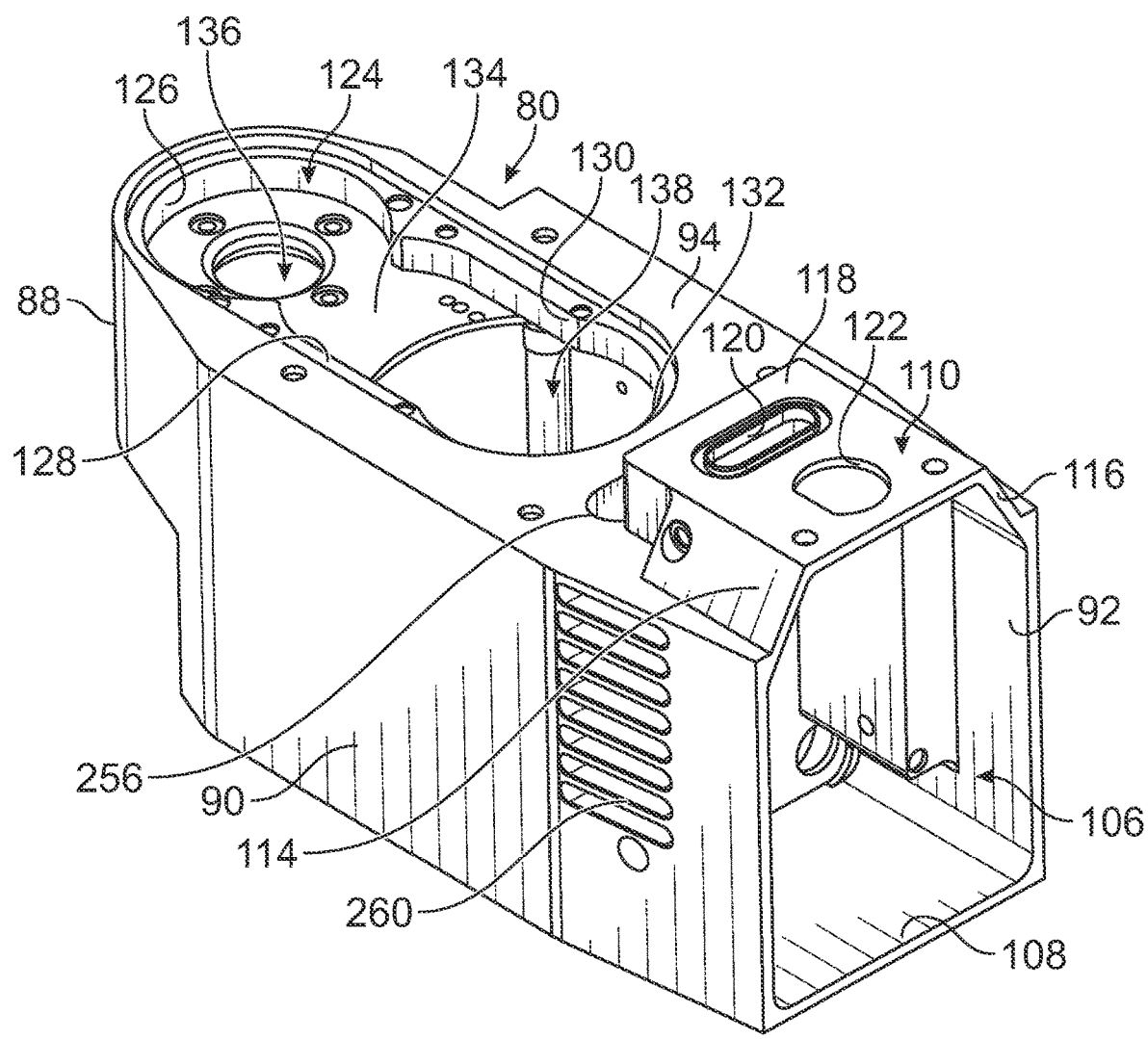
FIG. 12 is a perspective view of a lower housing portion of the valve operating machine.
Figure 13:
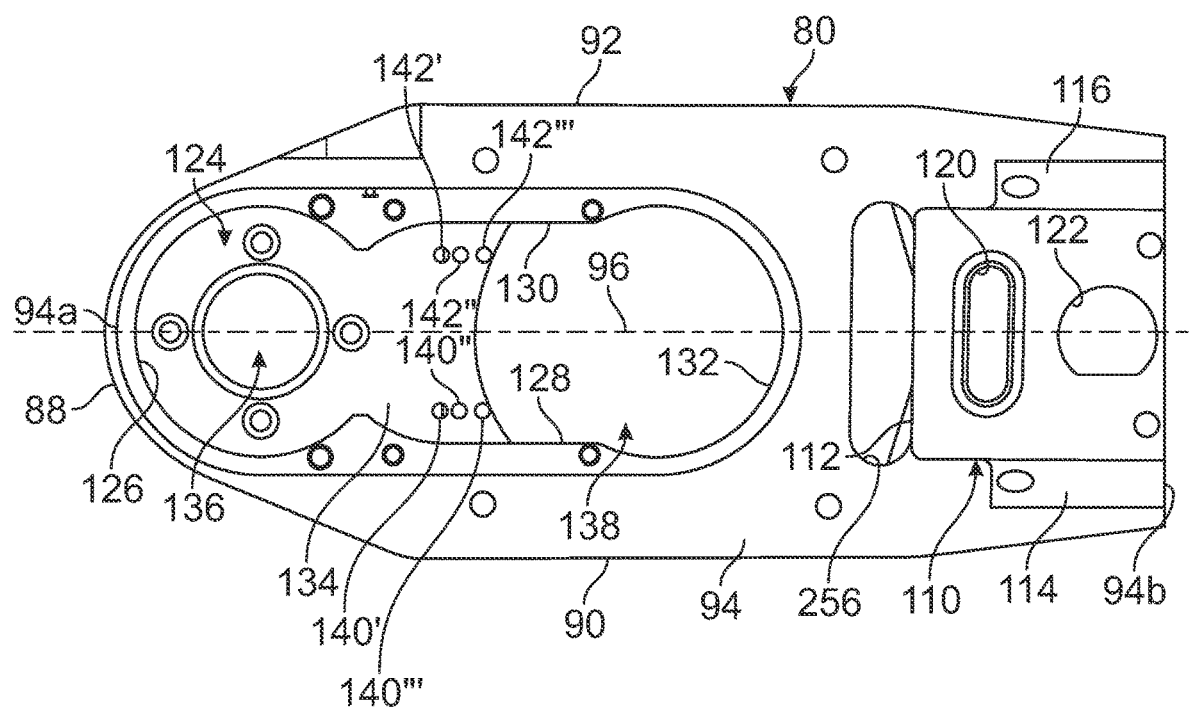
FIG. 13 is a top plan view of the lower housing portion shown in FIG. 12.
Figure 14:
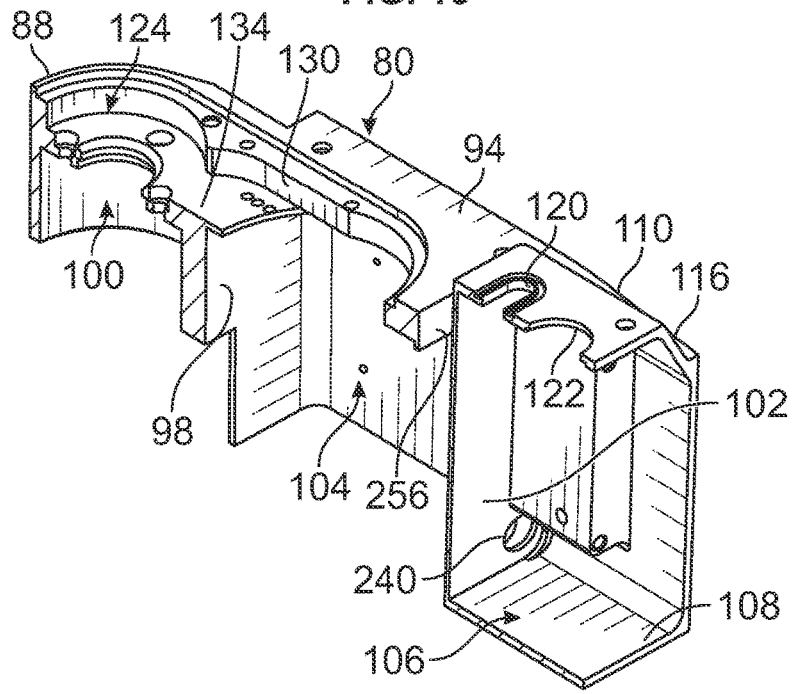
FIG. 14 is a cross-sectional view of the lower housing portion shown in FIG. 12 shown in perspective.

As best shown in FIGS. 12-14, the lower housing portion 80 includes a front wall 88, opposite side walls 90, 92 extending rearwardly from the front wall 88, and a top wall 94 which extends between the front and side walls 88, 90, 92. The top wall 94 has a front end 94a at the front wall 88 and an opposite rear end 94b. A central axis 96 is defined between the front and rear ends 94a, 94b. A first interior wall 98 extends downward from the top wall 94 and forms a front cavity 100 forwardly thereof. A second interior wall 102 extends downward from the top wall 94 and forms an intermediate cavity 104 forwardly of the second interior wall 102 and rearwardly of the first interior wall 98, and further forms a rear cavity 106 rearwardly thereof. The rear cavity 106 is closed by the rear wall 84 and a bottom wall 108. The forward and intermediate cavities 100, 104 have open lower ends.

A rear section 110 of the top wall 94 is raised to provide an increased height in the rear cavity 106. The raised rear section 110 includes a front wall 112 which extends upward from the top wall 94, opposite side walls 114, 116 extending rearwardly from the front wall 112 to the rear wall 84, and a top wall 118 which extends between the front and side walls 112, 114, 116 to the rear wall 84.

A first rear opening 120 is provided through the top wall 118 of the raised rear section 110 proximate to the front wall 112 and is communication with the rear cavity 106. A second rear opening 122 which is spaced rearwardly of the first rear opening 120 is provided through the top wall 118 and is communication with the rear cavity 106.

A gear receiving pocket 124 is formed in the top wall 94 proximate to the front end 94a and forward of the raised rear section 110. The gear receiving pocket 124 includes a front wall 126 which extends downward from the top wall 94, opposite side walls 128, 130 which extend downward from the top wall 94 and rearward from the front wall 126, a rear wall 132 which extends downward from the top wall 94 at the opposite ends of the side walls 128, 130, and a bottom wall 134 at the lower ends of the walls 126, 128, 130, 132. Each wall 126, 128, 130, 132 has a first wall portion that extends vertically downwardly from the top wall 984, a second wall portion that is perpendicular to the first wall portion and a third wall portion that extends vertically downwardly from the second wall portion. The first and second wall portions form a seat for the gear cover 86 to seat within. A front opening 136 is provided through the bottom wall 134 proximate to the front wall 126 and is in fluid communication with the front cavity 100. A rear opening 138 is provided through the bottom wall 94 proximate to the rear wall 132 and is in fluid communication with the intermediate cavity 104. Centers of the openings 136, 138 align with the central axis 96 of the lower housing portion 80.

A first set of spaced apart bores 140', 140", 140''' are formed in the bottom wall 134 forward of the rear opening 138. The bores 140', 140", 140''' are parallel to, but offset from the central axis 96, and are proximate to, but spaced from, the side wall 128. In an embodiment, the bores 140', 140", 140''' define a front bore 140', a middle bore 140" and a rear bore 140''' which are longitudinally aligned with each other. The rear bore 140''' is proximate to, but spaced forwardly of the rear opening 138. A second set of spaced apart bores 142', 142", 142''' are formed in the bottom wall 134 forward of the rear opening 138. The bores 142', 142", 142''' are parallel to, but offset from the central axis 96, and are proximate to, but spaced from, the side wall 130. In an embodiment, the bores 142', 142", 142''' define a front bore 142', a middle bore 142" and a rear bore 142''' which are longitudinally aligned with each other. The rear bore 142''' is proximate to, but spaced forwardly of the rear opening 138. The front bores 140', 142' longitudinally align with each other along the length of the top wall 94; the intermediate bores 140", 142" longitudinally align with each other along the length of the top wall 94; and the rear bores 140''', 142''' longitudinally align with each other along the length of the top wall.

The lower housing portion 80 is seated on the base 24, and the central axes 46, 96 align with each other.

The planetary gearbox 32, see FIG. 7, seats within the front cavity 100 of the lower housing portion 80 and partially seats within the front pocket 60 in the base 24. The planetary gearbox 32 includes a three-stage planetary gear system 144 housed within a thin walled planetary gearbox housing 146. In an embodiment, the three-stage planetary gear system 144 includes a plurality of helical spur gears which reduces the overall height of the planetary gearbox 32. An output socket 148 which is connected to an output of and driven by the planetary gearbox 32 extends through the passageway 62 in the base 24. The output socket 148 forms a blind bore. The planetary gearbox housing 146 is fixed to the base 24. A planetary gear spindle 150 extends upwardly from a top surface of the planetary gearbox housing 146 and through the front opening 136 in the gear receiving pocket 124.

Figure 5:
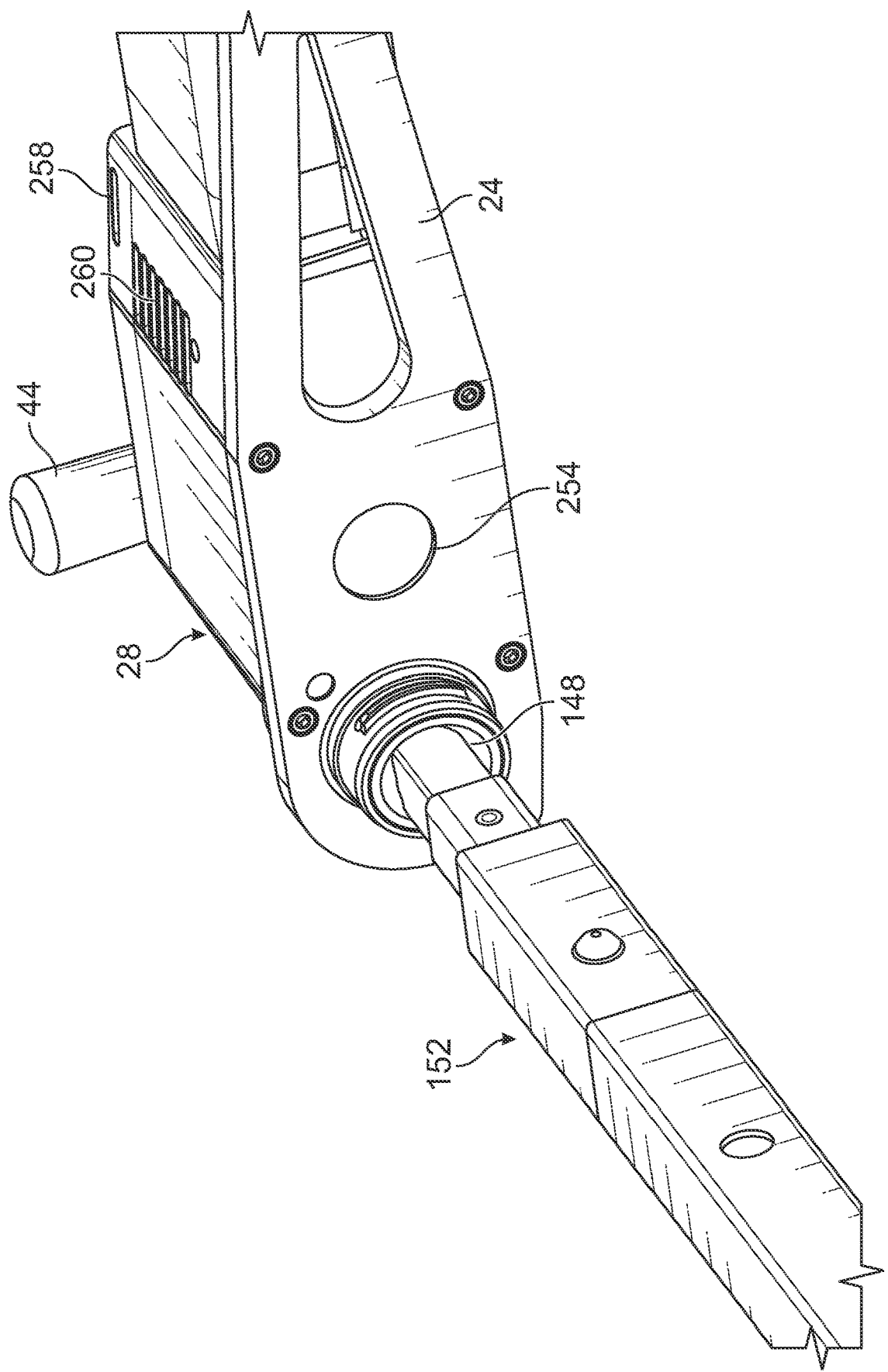
FIG. 5 is a partial bottom perspective view of the valve operating machine with the key of FIG. 4 attached thereto.

A key 152, see FIGS. 4 and 5, is configured to be attached to the output socket 148 during exercising of the valve 22. The key 152 can be detached from the output socket 148 so that another key can be mounted in the output socket 148.

Figure 15:
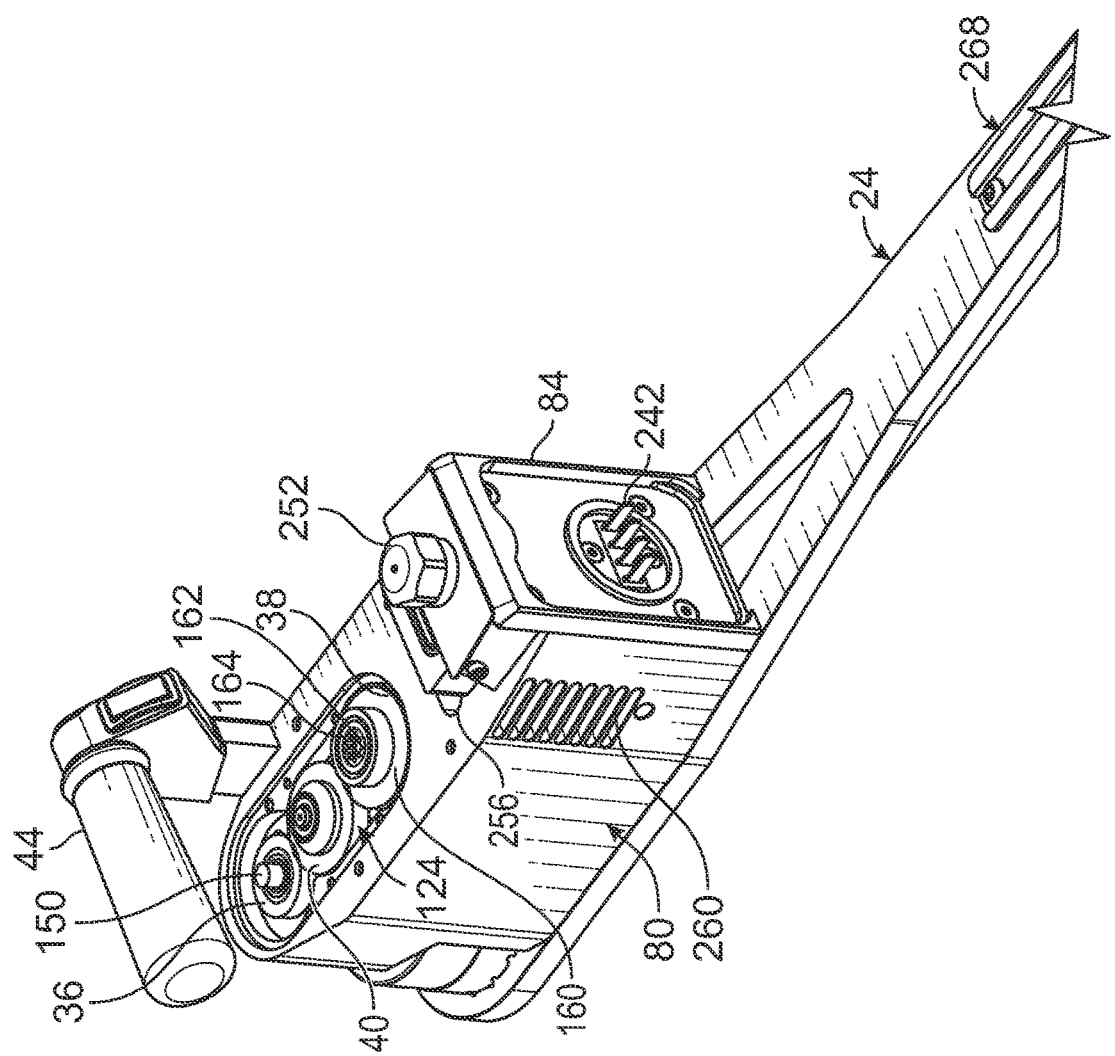
FIG. 15 is a partial perspective view of the valve operating machine with some components removed to show inner components of the valve operating machine.
Figure 16:
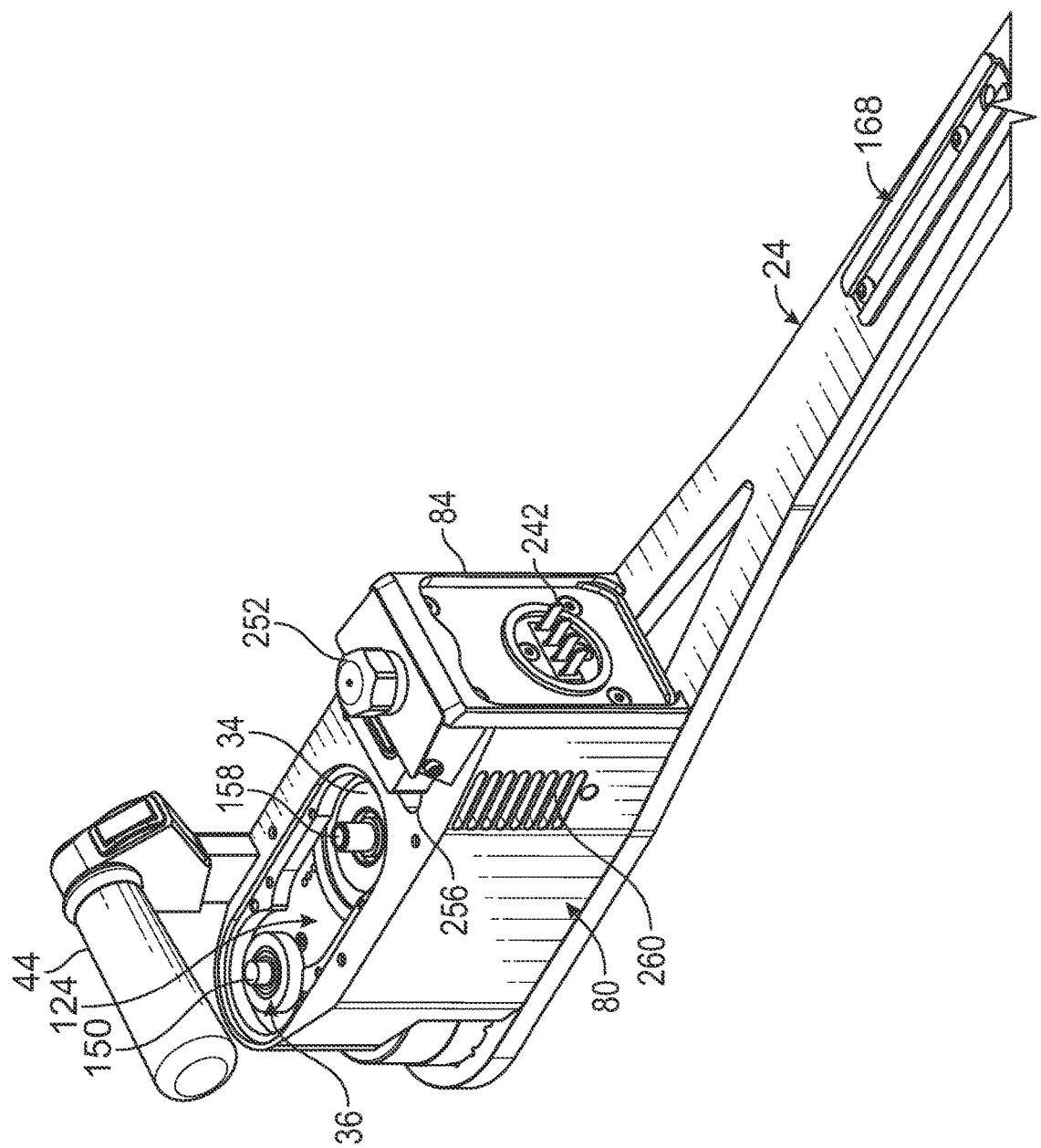
FIG. 16 is a partial perspective view of the valve operating machine with additional components removed from that which are shown in FIG. 15 to show further inner components of the valve operating machine.

The gear 36, see FIGS. 7 and 15, is a planetary input gear which is removably mounted to the planetary gear spindle 150, and seats within the gear receiving pocket 124. The planetary input gear 36 has a toothed profile on its outer perimeter. The planetary gear spindle 150 and the planetary input gear 36 are connected to each other such that the planetary input spindle 150 rotates with the planetary input gear 36. The planetary input spindle 150 is connected to the planetary gear housing 146 by a lower bearing 154 to allow the planetary input spindle 150 and the planetary input gear 36 to rotate relative to the planetary gear housing 146. An upper bearing 156 is seated on the planetary input spindle 150 and is spaced from the lower bearing 154.

As shown in FIG. 7, the motor 34 seats within the intermediate cavity 104 of the lower housing portion 80 and partially seats within the rear pocket 64 in the base 24. In some embodiments, the rear pocket 64 is removed and the motor 34 is sized to fit between the planar upper surface 24c of the base 24 and the lower surface of the top wall 94 of the lower housing portion 80. The motor 34 has a motor shaft 158 which extends upwardly from a top surface of the motor 34 and through the rear opening 138 in the gear receiving pocket 124. The motor 34 may be a DC motor.

The gear 38, see FIGS. 7 and 15, is a motor gear is mounted on the motor shaft 158 and seats within the gear receiving pocket 124. The motor gear 38 has a lower portion 160 having a toothed profile on its outer perimeter and an upper portion 162 that extends upwardly therefrom. A bearing 164 is mounted on the upper portion 162 and seats on an upper surface of the lower portion 160. The motor shaft 158 and the motor gear 38 are connected such that the motor gear 38 rotates with the motor shaft 158.

Figure 17:
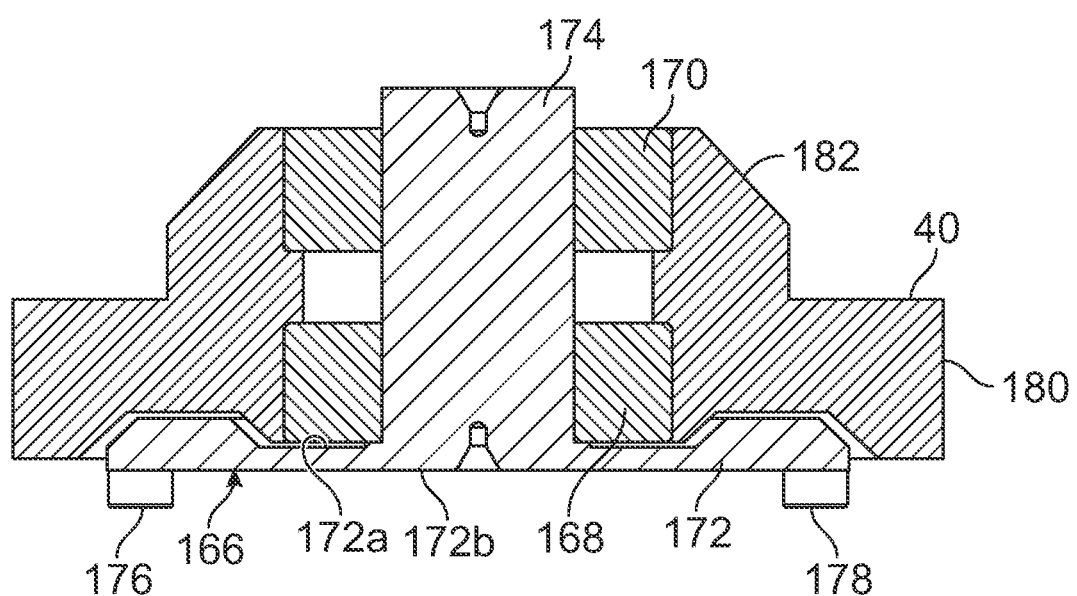
FIG. 17 is a cross-sectional view of an idler gear assembly of the valve operating machine.

The gear 40, see FIGS. 7, 15 and 17, is an idler gear which forms part of an idler gear assembly mounted in the gear receiving pocket 124 between the planetary input gear 36 and the motor gear 38. The idler gear assembly further includes an idler shaft 166 and a pair of bearings 168, 170. As best shown in FIG. 17, the idler shaft 166 has a base 172 having a shaft 174 extending upwardly from an upper surface 172a thereof at the center thereof, and a pair of spaced apart pins 176, 178 extending downwardly from a lower surface 172b thereof and at diametrically opposed positions which are radially outward of the shaft 174. The idler gear 40 is mounted on the shaft 174 by the bearings 168, 170 so that the idler gear 40 rotates relative to the shaft 166. The idler gear 40 has a lower portion 180 which surrounds the bearing 168 and has a toothed profile on its perimeter, and an upper portion 182 which extends upwardly from the lower portion 180 and surrounds the bearing 170. A portion of the shaft 174 extends upwardly from the bearing 170. The idler gear assembly is attached to the bottom 134 of the gear receiving pocket 124 by the pins 176, 178 seating with one of the aligned pairs of bores, for example bores 140', 142'. The idler gear assembly can be attached within the gear receiving pocket 124 by the pins 176, 178 seating with the front bores 140', 142', by the pins 176, 178 seating with the intermediate bores 140", 142", or by the pins 176, 178 seating with the rear bores 140''', 142'''. The shaft 174 aligns longitudinally with the aligned central axes 46, 96 of the base 24 and the housing 28.

The toothed profile on the planetary input gear 36 meshes with the toothed profile of the idler gear 40, and the toothed profile of the idler gear 40 meshes with the toothed profile of the motor gear 38. Thus, when the motor 34 is actuated, the motor gear 38 is driven, thereby causing the idler gear 40 and the planetary input gear 36 to rotate. When the planetary input gear 36 rotates, the three-stage planetary gear system 144 within the planetary gearbox 32 rotate which, in turn, causes the output socket 148 to rotate, and further in turn causes the key 152 to rotate. This provides a high efficiency gearing reduction. It has been found because of the gear combination used, that a 90% efficiency can be obtained.

Which pair of bores 140', 142' or 140", 142" or 140''', 142''' the idler gear assembly is seated dictates the relative sizes of the planetary input gear 36 and the motor gear 38, thereby allowing the gear ratio to be changed by the manufacturer.

Figure 18:
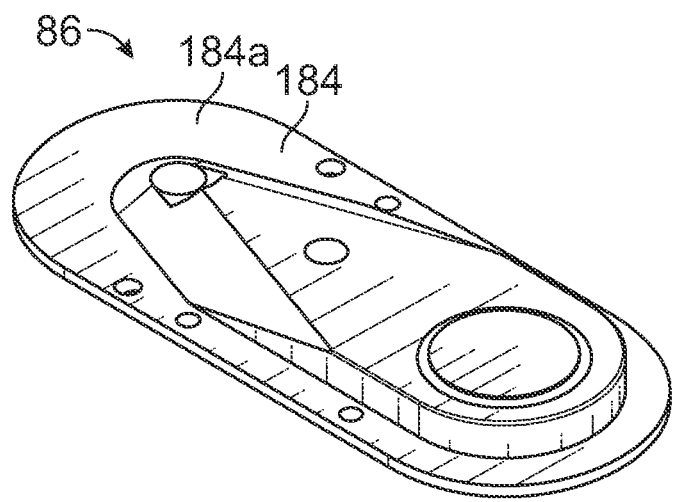
FIGS. 18 and 19 are perspective views of a gear cover of the valve operating machine.
Figure 19:
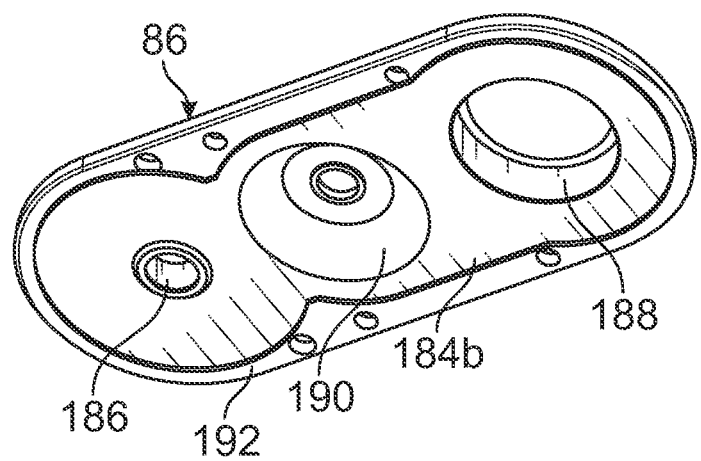
Figure 20:
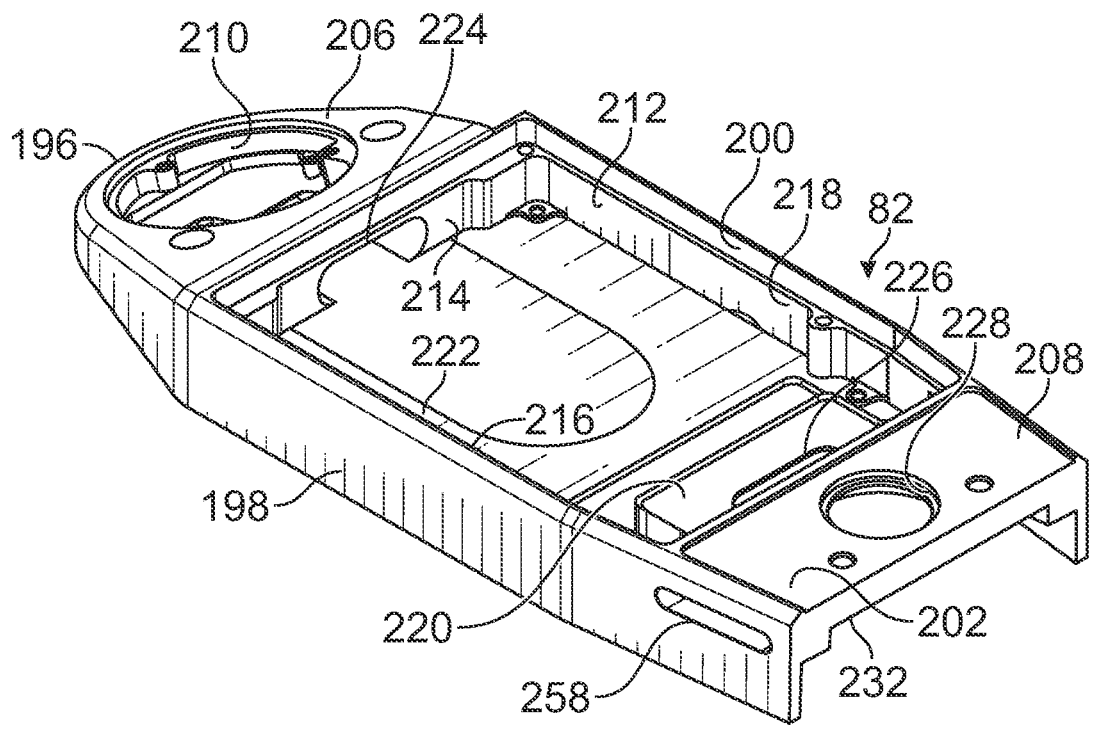
FIGS. 20 and 21 are perspective views of an upper housing portion of the valve operating machine.
Figure 21:
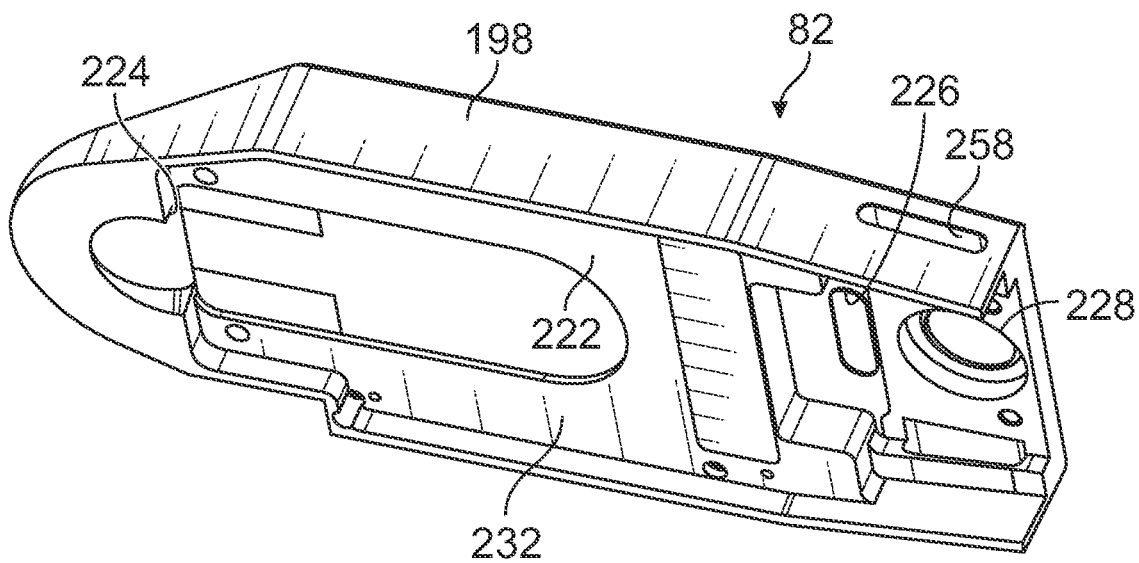
Figure 22:
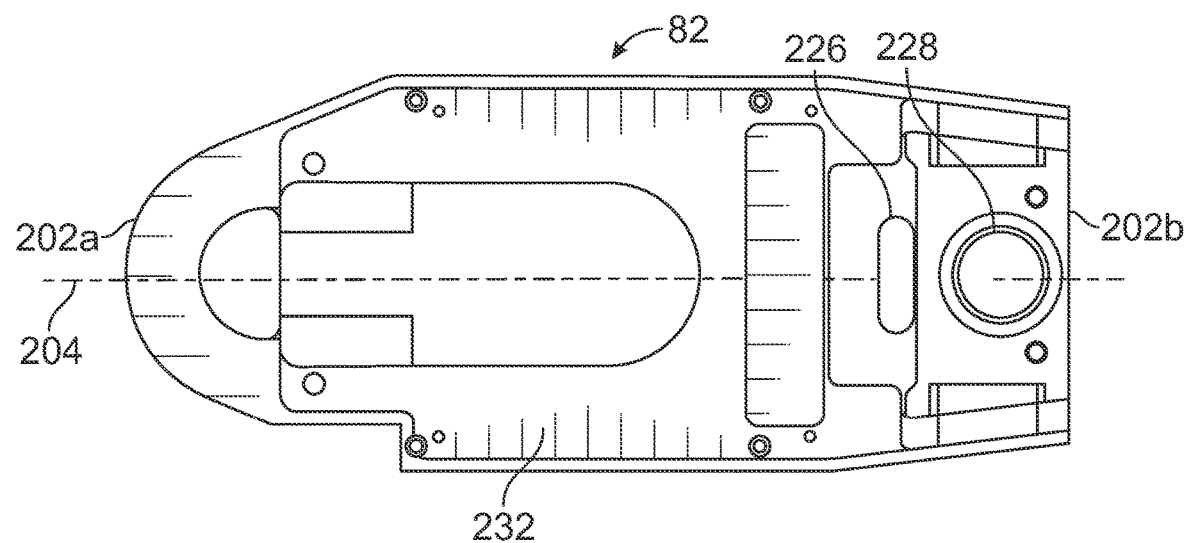
FIG. 22 is a top plan view of the upper housing portion shown in FIGS. 20 and 21.
Figure 23:
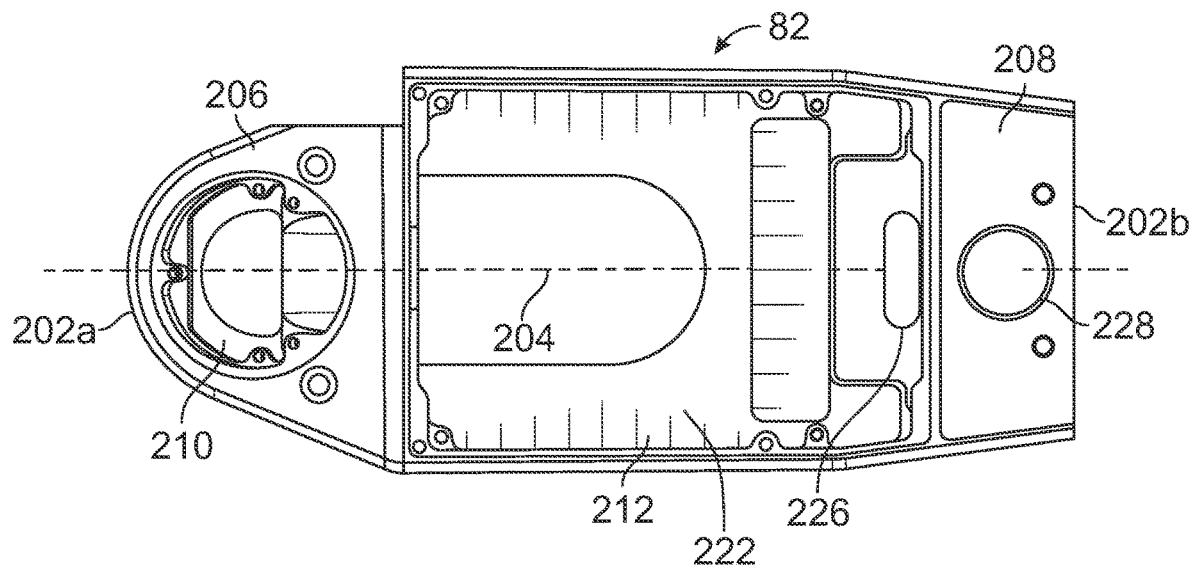
FIG. 23 is a bottom plan view of the upper housing portion shown in FIGS. 20 and 21.

As best shown in FIGS. 7, 18 and 19, the gear cover 86 is formed from a wall 184 having an upper surface 184a and a planar lower surface 184b. Front, rear and intermediate recesses 186, 188, 190 extend upward from the lower surface 184b. A lip 192 extends downward from the lower surface 184b around the perimeter of the recesses 186, 188, 190 and mirrors the shape the first and second wall portions of the walls 126, 128, 130, 132 which form the seat in the gear receiving pocket 124 of the lower housing portion 80. The gear cover 86 seats on the lower housing portion 80 such that the lip 192 is within the seat and the gears 36, 38, 40 are positioned therebetween in a cavity 194 formed by the gear receiving pocket 124 and the recesses 186, 188, 190 and the lip 192.

The planetary gear spindle 150 of the planetary gear 36 seats within the front recess 186. The planetary input gear 36 and its upper bearing 156 are positioned between the lower surface 184b of the gear cover 86 and the bottom wall 134 of the gear receiving pocket 124 in the lower housing portion 80. The upper portion 162 of the motor gear 38 and its bearing 164 seat within the rear recess 188. The lower portion 160 is positioned between the lower surface 184b of the gear cover 86 and the bottom wall 134 of the gear receiving pocket 124 in the lower housing portion 80. The upper portion 182 of the idler gear 40, the bearing 170 and the portion of the shaft 174 that extends upwardly from the bearing 170 seat within the intermediate recess 190. The lower portion 180, the bearing 168 and the base 172 are positioned between the lower surface 184b of the gear cover 86 and the upper end of the motor 34. The gear cover 86 and the lower housing portion 80 and the motor 34 support the gears 36, 38, 40 for rotation within the cavity 194.

Since which pair of bores 140', 142' or 140", 142" or 140''', 142''' the idler gear assembly is seated dictates the relative sizes of the planetary input gear 36 and the motor gear 38, three separate gear covers 86 are necessary to accommodate the three different positions that the idler gear assembly is seated within to ensure that the gear 36, 38, 40 are trapped by the gear cover 86.

As best shown in FIGS. 20-23, the upper housing portion 82 includes a front wall 196, opposite side walls 198, 200 extending rearwardly from the front wall 196 to the rear wall 84, and a top wall 202 which extends between the front and side walls 196, 198, 200 and extends to the rear wall 84. The top wall 202 has a front end 202a at the front wall 88 and an opposite rear end 202b. A central axis 204 is defined between the front and rear ends 202a, 202b.

The top wall 202 has a front portion 206 which is angled relative to the central axis 204, and a rear portion 208 which extends from the front portion 206 and is planar.

A first front pocket 210 is provided in the front portion 206 and extends downward from the top wall 202. A second pocket 212 is rearward of the front portion 206 and extends downward from the top wall 202. The second pocket 212 includes a front wall 214, side walls 216, 218 extending rearwardly from the front wall 214, a rear wall 220 at the opposite ends of the side walls 216, 218, and a bottom wall 222 extending between the walls 214, 216, 218, 220. An opening 224 is provided through the front wall 214 of the second pocket 212 to allow communication between the first pocket 210 and the second pocket 212. An opening 226 is provided through the bottom wall 222 proximate to the rear wall 220. A rear opening 228 is provided through the top wall 202 proximate to the rear end 202b.

A lower recess 232 is formed by the front and side walls 196, 198, 200 which is open to the rear. The openings 226, 228 are in communication with the lower recess 232.

The upper housing portion 82 seats over the gear cover 86 and over the raised rear section 110 of the top wall 94 and is attached to the top wall 94 of the lower housing portion 80 and to the rear wall 84. The central axes 46, 96, 204 align with each other. This attachment forms an electronics receiving cavity 234, see FIG. 7, between the upper housing portion 82, the gear cover 86, the lower housing portion 80 and the rear wall 84. The opening 226 in the upper housing portion 82 aligns with the opening 120 through the lower housing portion 80 and the openings 120, 226 are in communication with the electronics receiving cavity 234. The opening 228 in the upper housing portion 82 aligns with the opening 122 through the lower housing portion 80 and the openings 122, 228 are in communication with the electronics receiving cavity 234.

The display 42, which allows the operator to interact with and control the valve operating machine 20, is mounted within the second pocket 212 and is sealed thereto by a seal. In some embodiments, the display 42 is removable from the second pocket 212. A display controller 236, such as a printed circuit board having suitable software and firmware, an on-board memory and WI-FI capabilities, for operating the display 42 is provided within the second pocket 212. Cabling connected to the display controller 236 passes from the second pocket 212 in the upper housing portion 82, between the raised rear section 110 of the lower housing portion 80 and the display 42, through the opening 226, through the electronics receiving cavity 234, through the opening 120 in the lower housing portion 80 and into the rear cavity 106.

A motor controller 238 is mounted within the rear cavity 106 and is in electrical communication with display controller 236 via the cabling. The motor controller 238 is further in electrical communication with the motor 34 via cabling which passes through an opening 240 through the interior wall 102. This cabling is sealed to the opening 240 to keep the rear cavity 106 sealed. A sealed connector 242 is mounted through the rear wall 84 and extends into the rear cavity 106 and is electrically connected to the motor controller 238.

Since separate controllers 236, 238 are provided for operating the display 42 and the motor 34, if it is desirable to change the motor 34 for a new motor, this can be done easily without needing to change the display controller 236. Likewise, since separate controllers 236, 238 are provided for operating the display 42 and the motor 34, if it is desirable to change the display 42 for a new display, this can be done easily without needing to change the motor controller 238.

A global positioning emitter 244 is mounted within the front pocket 210 of the upper housing portion 82 and is covered by a cover 246, which may be formed of plastic, which is sealed to the top wall 202 of the upper housing portion 82. The global positioning emitter 244 is connected to the display controller 236 via cabling which pass through the opening 224 between the first pocket 210 and the second pocket 212.

Figure 24:
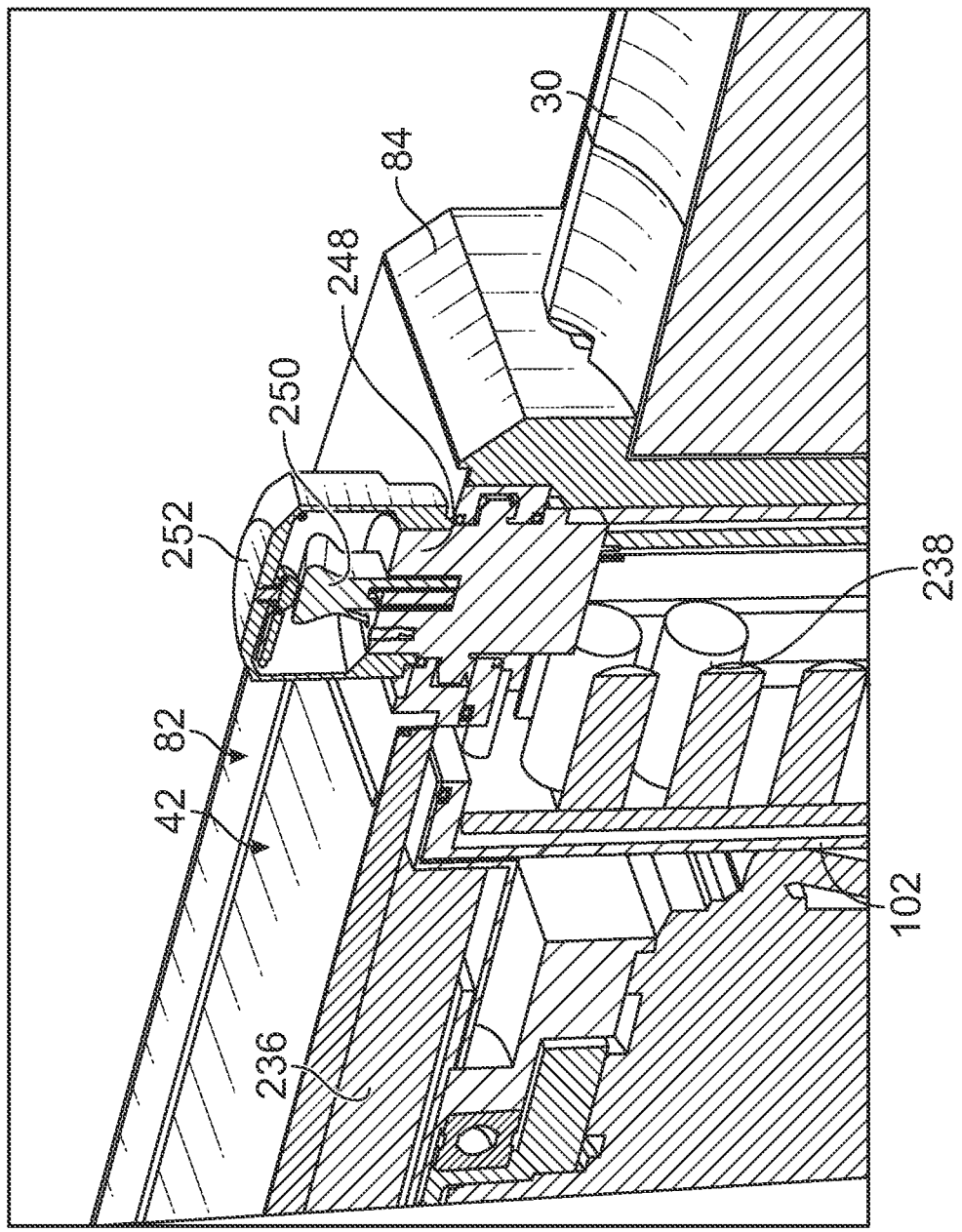
FIG. 24 is a partial cross-sectional view of the valve operating machine shown in perspective.

A Universal Serial Bus (USB) connector 248 is sealingly mounted within the openings 228, 122 by sealing members, such as an O-rings, and extends into the rear cavity 106 of the lower housing portion 80, see FIG. 24. The USB connector 248 is connected to the display controller 236 via cabling which passes through the rear cavity 106, the opening 120 and passes into the second pocket 212 and is electrically connected to the display controller 236. The USB connector 248 can also be electrically connected to the motor controller 238. A removable Universal Serial Bus (USB) 250 is mounted within the USB connector 248. A cover 252 is removably attached to the USB connector 248 and when connected to the USB connector 248 is sealingly engaged therewith by a sealing member, such as an O-ring. This provides a waterproof seal for the USB 250. The cover 252 may be connected to the upper housing portion 82 by a lanyard.

As a result of this arrangement, the planetary gear spindle 150, the motor shaft 158 and the idler shaft 166 are parallel to each other, but are offset longitudinally from each other along the central axes 46, 96, 204 of the base 24 and the lower and upper housings 80, 82. Each gear 36, 38, 40 sits horizontally relative to the base 24.

The planetary gearbox 32 and the motor 34 are in a horizontal layer with each other and above the base 24. The gears 36, 38, 40 are in a horizontal layer which is stacked above the planetary gearbox 32 and the motor 34. The display controller 236 is in a horizontal layer which is stacked above the gears 36, 38, 40. The display 42 is in a horizontal layer which is stacked above the display controller 236. This allows for a compact arrangement of the components, a reduced height of the overall assembly, and provides for even weight distribution.

A cooling system is provided to vent heat generated by the motor 34 and the controllers 236, 238 from the housing 28. The cooling system includes an opening 254 in the base 24, an opening 256 in the lower housing portion 80, an opening 258 in the upper housing portion 82, and fins 260 in the lower housing portion 80. The opening 254 in the base 24 is provided through the base 24 and within the rear pocket 64. The opening 254 extends to the lower surface 24*d* of the base 24. A center of the opening 254 may align with the central axis 46 of the base 24. The opening 256 in the lower housing portion 80 is through the top wall 94 forward of the raised rear section 110, and is in communication with the electronics receiving cavity 234. The opening 258 is through the side wall 198 proximate to the rear end 202*b*. The opening 258 is in fluid communication with the electronics receiving cavity 234. The fins 260 are formed in the exterior surface of the side walls 90, 92 proximate to the rear cavity 106. To cool the components, air comes in through the opening 254 in the base 24 and passes into the rear pocket 64. The air flows around the motor 34 and through the intermediate cavity 104. The air passes through the opening 256 in the top wall 94 of the lower housing portion 80 and into the electronics receiving cavity 234. The air flows through the electronics receiving cavity 234 and out of the opening 258 of the upper housing portion 82. The fins 260 also dissipate heat by conduction.

The second handle 44 is attached to the lower housing portion 80 and extends upward and over the upper housing portion 82. The second handle 44 includes a vertical arm portion 262 which is attached to the side wall 92 proximate to the front wall 88 and which extends upward therefrom, and a horizontal arm portion 264 which extends from an upper end of the vertical arm portion 262 and over the front portion 206 of the top wall 202 of the second housing portion 82. The horizontal arm portion 264 has a grip material thereon, which may include a cushion, to provide the operator with a comfortable grip. The horizontal arm portion 264 extends over the cover 246 for the global positioning emitter 244 so as to not block the operator's view of the display 42 from above. Because of the position of the second handle 44, if the valve operating machine 20 is dropped upside-down, the second handle 44 serves to protect the display 42 from damage.

A control switch 266 for controlling the direction of rotation of the output socket 148, and thus the key 152, is provided at an upper end of the vertical arm portion 262 to allow an operator to easily operate the valve operating machine 20 with the operator's thumb. A channel (not shown) is provided through the vertical arm portion 262 to allow for cabling to connect the control switch 266 to the display controller 236.

Figure 25:
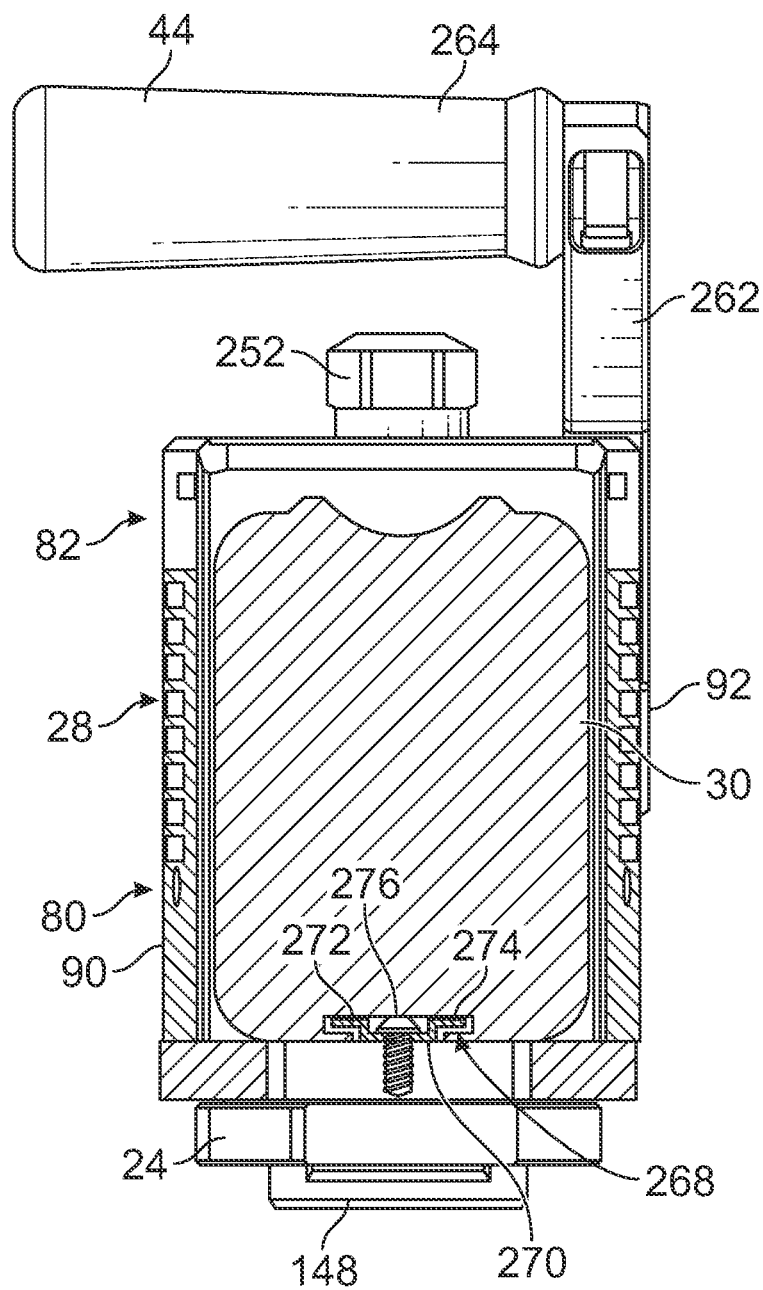
FIG. 25 is a partial cross-sectional view of the valve operating machine.

As best shown in FIGS. 8 and 25, a cleat 268 is attached to the upper surface 24*c* of the second intermediate section 50 of the base 24 so that the battery 30 can be removably attached thereto and connected to the connector 242. The cleat 268 may be an elongated member having a generally U-shaped cross-section having a lower base wall 270 which abuts against the upper surface 24*c* of the second intermediate section 50 and L-shaped side walls 272, 274 extending from the side edges of the base wall 270. The battery 30 has a corresponding channel 276 provided in a bottom surface thereof which receives the cleat 268 to secure the battery 30 to the base 24. The battery 30 is elongated and has a central axis which aligns with the central axis 46 of the base 24 so that the weight of the battery 30 is evenly distributed on the sides of the base 24. The central axis of the battery 30 is in-line with the planetary gear spindle 150, the motor shaft 158 and the idler shaft 166. When the battery 30 is mounted on the base 24, the battery 30 engages with the connector 242 to provide power to the motor controller 238 and motor 34. The rear wall 84 further has a shoulder 278 which extends rearward, and the battery 30 seats under the shoulder 278. Since the rear wall 84 is non-metallic, the rear wall 84 electrically isolates the battery 30 from the housing 28. The cleat 268 and the base 24 further have aligned openings 280, 282 therethrough proximate to the rear end of the cleat 268. The battery 30 has an extendable pin 284 that can be extended into the aligned openings 280, 282 to further secure the battery 30 to the cleat 268 and the base 24 by turning a key in a lock 286. A non-metallic sealing gasket 288 is also provided around the perimeter of the battery 30 to seal the battery 30 to the housing 28 and further electrically isolate the battery 30 from the housing 28. The motor controller 238 has suitable software and firmware for communication between the battery 30 and the motor 34 and additionally to the display controller 236. The battery 30 is removable from the base 24 by disengaging the pin 284 from the openings 282, 280, and sliding the battery 30 rearward along the base 24 to disengage the battery 30 from the shoulder 278, the connector 242 and from the cleat 268. After recharging, the battery 30 can be reassembled with the base 24. Alternatively, a replacement battery can be attached to the valve operating machine 20 if the first battery 30 is expended during an exercising operation. The battery 30 can be quickly and easily swapped for such a new battery during use.

In an embodiment, the battery 30 has a start button 290 which is activated by the operator to start operation of the valve operating machine 20.

The battery 30 provides all of the power needed by the valve operating machine 20 to operate such that the valve operating machine 20 is self-contained and does not rely upon an external power source.

Because of the packaging of the valve operating machine 20 with the parallel planetary gear spindle 150, the motor shaft 158 and the idler shaft 166 and the in-line battery 30, the valve operating machine 20 is compact in form and allows the valve operating machine 20 to be easily carried by an operator to a jobsite.

In use, the operator carries the valve operating machine 20 from the truck to the jobsite. The operator can easily carry the valve operating machine 20 with one hand by grasping the second handle 44. The operator positions the valve operating machine 20 over the valve 22 to be exercised. The key 152 is inserted into the output socket 148 and the height of the key 152 is adjusted so that the valve operating machine 20 is at an ergonomic height for the operator. One positioned, the operator grasps both handles 26, 44 and engages the start button 290. With the thumb of the one hand, the operator controls the rotation of the key 152 to exercise the valve 22 by toggling the control switch 266. The display 42 is easily viewable by the operator since the display 42 is not blocked from view by the handle 44. In addition, because the operator's hand is over the display 42 when grasping the handle 44, the operator's hand can block the sun from shining onto the display 42 for better viewing of the display in sunny conditions. The first and second handles 26, 44 are spaced apart from each other at a sufficient distance so that the operator can easily steady the valve operating machine 20 during use.

The Abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

Also, the following examples are provided, which are numbered for easier reference.

1. A valve operating machine comprising:
a base defining a central axis extending from a first end thereof to a second end thereof;
a housing on the base;
a motor within a first cavity in the housing, the motor having a motor shaft extending perpendicular to the central axis and being longitudinally aligned with the central axis;
a planetary gearbox within a second cavity in the housing, the planetary gearbox including a plurality of planetary gears and a planetary gear spindle, the planetary gear spindle extending perpendicular to the central axis and being longitudinally aligned with the central axis;
a motor gear within a third cavity in the housing, wherein the motor shaft extends into the third cavity and the motor gear is mounted on the motor shaft and is configured for rotation with the motor shaft;
a planetary input gear within the third cavity, wherein the planetary gear spindle extends into the third cavity and the planetary input gear is mounted on the planetary gear spindle and is configured for rotation with the planetary gear spindle;
an idler gear mounted within the third cavity between the motor gear and the planetary input gear, the idler gear engaged with the motor gear and with the planetary input gear; and
an output socket connected to the planetary gearbox and extending through the base, wherein a key that is used to exercise a valve can be connected to the output socket.

2. The valve operating machine of example 1, further comprising a handle on the second end of the base and aligned with the center axis of the base, wherein the handle is configured to be grasped by operator, and wherein the housing is spaced from the handle.

3. The valve operating machine of example 2, wherein the base has a first rectangular section which engages with a first rectangular section of the handle and the base has a second rectangular section which engages with a second rectangular section of the handle, the first and second sections of the base being spaced apart from each other, and wherein the first rectangular section of the handle is wider than the second rectangular section of the handle.

4. The valve operating machine of example 3, wherein the second rectangular section is proximate to the second end of the base and the first rectangular section is spaced from the second end of the base.

5. The valve operating machine of example 2, further comprising a second handle on the housing.

6. The valve operating machine of example 1, wherein the motor gear is removably mounted to the motor shaft and the planetary input gear is removably mounted to the planetary gear spindle, and wherein idler gear can be positioned within the third cavity in a variety of positions relative to the motor shaft and the planetary gear spindle.

7. The valve operating machine of example 6, wherein the idler gear can be placed into three different positions relative to the motor shaft and the planetary gear spindle.

8. The valve operating machine of example 6, wherein the idler gear comprises a base having an idler shaft extending therefrom, the base of the idler gear having two pins extending therefrom, and a toothed gear rotatably mounted on the idler shaft.

9. The valve operating machine of example 8, further comprising a gear cover mounted within the housing and engaged with the idler shaft.

10. The valve operating machine of example 1, wherein the idler gear comprises a base having an idler shaft extending therefrom, the base of the idler gear having two pins extending therefrom, and a toothed gear rotatably mounted on the idler shaft.

11. The valve operating machine of example 10, further comprising a gear cover mounted within the housing and engaged with the idler shaft.

12. The valve operating machine of example 1, further comprising a battery mounted on the base, the battery is in electronic communication with the motor.

13. The valve operating machine of example 12, wherein the battery is removably mounted on the base.

14. The valve operating machine of example 13, further comprising a cleat on the base, the battery being engageable with the cleat.

15. The valve operating machine of example 14, wherein the housing further has a shoulder with which the battery is engaged.

16. The valve operating machine of example 12, wherein the battery defines a central axis extending from a first end thereof to a second end thereof, the central axis of the battery being parallel to the central axis of the base.

17. The valve operating machine of example 1, further comprising:
a motor controller within a fourth cavity in the housing and configured to control operation of the motor;
a display mounted on the housing; and
a display controller within a fifth cavity in the housing and configured to control operation of the display.

18. The valve operating machine of example 17, further comprising a global positioning emitter mounted on the housing.

19. The valve operating machine of example 18, wherein the global positioning emitter is mounted within a sixth cavity in the housing.

20. The valve operating machine of example 17, further comprising a Universal Serial Bus connector sealingly mounted to the housing.

21. The valve operating machine of example 20, further comprising a Universal Serial Bus removably mounted within the Universal Serial Bus connector, and a cover removably attached to the Universal Serial Bus connector, wherein when the cover is sealingly attached to the Universal Serial Bus connector.

22. The valve operating machine of example 1, further comprising an opening through the base which is fluid communication with the third cavity, and a plurality of fins formed in the housing.

While various embodiments of the disclosure have been described, it will be apparent to those of ordinary skill in the art that other embodiments and implementations are possible within the scope of the disclosure. Accordingly, the disclosure is not to be restricted except in light of the attached claims and their equivalents.

The invention claimed is:

1. A valve operating machine comprising:
a base defining a central axis extending from a first end thereof to a second end thereof;
a housing on the base;
a motor within a first cavity in the housing, the motor having a motor shaft extending perpendicular to the central axis and being longitudinally aligned with the central axis;
a planetary gearbox within a second cavity in the housing, the planetary gearbox including a plurality of planetary gears and a planetary gear spindle, the planetary gear spindle extending perpendicular to the central axis and being longitudinally aligned with the central axis;
a motor gear within a third cavity in the housing, wherein the motor shaft extends into the third cavity and the motor gear is mounted on the motor shaft and is configured for rotation with the motor shaft;
a planetary input gear within the third cavity, wherein the planetary gear spindle extends into the third cavity and the planetary input gear is mounted on the planetary gear spindle and is configured for rotation with the planetary gear spindle;
an idler gear mounted within the third cavity between the motor gear and the planetary input gear, the idler gear engaged with the motor gear and with the planetary input gear; and
an output socket connected to the planetary gearbox and extending through the base, wherein a key that is used to exercise a valve can be connected to the output socket.

2. The valve operating machine of claim 1, further comprising a handle on the second end of the base and aligned with the center axis of the base, wherein the handle is configured to be grasped by operator, and wherein the housing is spaced from the handle.

3. The valve operating machine of claim 2, wherein the base has a first rectangular section which engages with a first rectangular section of the handle and the base has a second rectangular section which engages with a second rectangular section of the handle, the first and second sections of the base being spaced apart from each other, and wherein the first rectangular section of the handle is wider than the second rectangular section of the handle.

4. The valve operating machine of claim 3, wherein the second rectangular section is proximate to the second end of the base and the first rectangular section is spaced from the second end of the base.

5. The valve operating machine of claim 2, further comprising a second handle on the housing.

6. The valve operating machine of claim 1, wherein the motor gear is removably mounted to the motor shaft and the planetary input gear is removably mounted to the planetary gear spindle, and wherein idler gear can be positioned within the third cavity in a variety of positions relative to the motor shaft and the planetary gear spindle.

7. The valve operating machine of claim 6, wherein the idler gear can be placed into three different positions relative to the motor shaft and the planetary gear spindle.

8. The valve operating machine of claim 6, wherein the idler gear comprises a base having an idler shaft extending therefrom, the base of the idler gear having two pins extending therefrom, and a toothed gear rotatably mounted on the idler shaft.

9. The valve operating machine of claim 8, further comprising a gear cover mounted within the housing and engaged with the idler shaft.

10. The valve operating machine of claim 1, wherein the idler gear comprises a base having an idler shaft extending therefrom, the base of the idler gear having two pins extending therefrom, and a toothed gear rotatably mounted on the idler shaft.

11. The valve operating machine of claim 10, further comprising a gear cover mounted within the housing and engaged with the idler shaft.

12. The valve operating machine of claim 1, further comprising a battery mounted on the base, the battery is in electronic communication with the motor.

13. The valve operating machine of claim 12, wherein the battery is removably mounted on the base.

14. The valve operating machine of claim 13, further comprising a cleat on the base, the battery being engageable with the cleat.

15. The valve operating machine of claim 14, wherein the housing further has a shoulder with which the battery is engaged.

16. The valve operating machine of claim 12, wherein the battery defines a central axis extending from a first end thereof to a second end thereof, the central axis of the battery being parallel to the central axis of the base.

17. The valve operating machine of claim 1, further comprising:
a motor controller within a fourth cavity in the housing and configured to control operation of the motor;
a display mounted on the housing; and
a display controller within a fifth cavity in the housing and configured to control operation of the display.

18. The valve operating machine of claim 17, further comprising a global positioning emitter mounted on the housing.

19. The valve operating machine of claim 18, wherein the global positioning emitter is mounted within a sixth cavity in the housing.

20. The valve operating machine of claim 17, further comprising a Universal Serial Bus connector sealingly mounted to the housing.

21. The valve operating machine of claim 20, further comprising a Universal Serial Bus removably mounted within the Universal Serial Bus connector, and a cover removably attached to the Universal Serial Bus connector, wherein when the cover is sealingly attached to the Universal Serial Bus connector.

22. The valve operating machine of claim 1, further comprising an opening through the base which is fluid communication with the third cavity, and a plurality of fins formed in the housing.

* * * * *